(12) United States Patent
Ciechomski et al.

(10) Patent No.: US 8,995,812 B2
(45) Date of Patent: Mar. 31, 2015

(54) FIBER OPTIC MANAGEMENT UNIT AND FIBER OPTIC DISTRIBUTION DEVICE

(71) Applicant: CCS Technology Inc., Wilmington, DE (US)

(72) Inventors: Tomasz Andrzej Ciechomski, Lowicz (PL); Grzegorz Fabrykowski, Strykow (PL); Michal Ruda, Lodz (PL); Sven Strunck, Berlin (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 14/060,966

(22) Filed: Oct. 23, 2013

(65) Prior Publication Data

US 2014/0119704 A1 May 1, 2014

(30) Foreign Application Priority Data

Oct. 26, 2012 (EP) .................................... 12190123

(51) Int. Cl.
*G02B 6/00* (2006.01)
*G02B 6/44* (2006.01)
*G02B 6/38* (2006.01)

(52) U.S. Cl.
CPC ............ *G02B 6/4452* (2013.01); *G02B 6/4455* (2013.01); *G02B 6/4477* (2013.01);
(Continued)

(58) Field of Classification Search
CPC .. G02B 6/4452; G02B 6/4455; G02B 6/4453; G02B 6/3897; G02B 6/4477; G02B 6/4446; G02B 6/4439; G02B 6/4454

USPC .................................................. 385/134–139
See application file for complete search history.

(56) References Cited

U.S. PATENT DOCUMENTS 620,013 A 2/1899 Barnes
2,528,910 A 11/1950 Poe
(Continued)

FOREIGN PATENT DOCUMENTS

AU 2010270959 A1 2/2012
CA 2029592 A1 5/1992
(Continued)

OTHER PUBLICATIONS

Non-final Office Action for U.S. Appl. No. 13/539,683 mailed Jul. 24, 2014, 10 pages.
(Continued)

*Primary Examiner* — Ryan Lepisto
*Assistant Examiner* — Guy Anderson (57) ABSTRACT

A fiber optic management unit for handling optical fibers unit having a base with first and second segments miming perpendicular to each other. A tray is pivotably attached to the second segment such that the tray is transferable between a first position in which the fiber routing track of the first segment is closed and a second position in which the fiber routing track of the first segment is opened when the tray is pivoted around a first axis, and wherein the tray is transferable between the second position in which the fiber routing track of the first segment is opened and a third position in which the fiber routing track of the first segment is also opened when the tray is pivoted around a second axis running perpendicular to the first axis.

14 Claims, 4 Drawing Sheets

FIG. 3

(52) U.S. Cl.
CPC ............. *G02B6/4446* (2013.01); *G02B 6/3897* (2013.01); *G02B 6/4453* (2013.01); *G02B 6/4454* (2013.01); *G02B 6/4439* (2013.01); *G02B 6/4471* (2013.01)
USPC ........... 385/135; 385/134; 385/136; 385/137; 385/138; 385/139

(56) References Cited

U.S. PATENT DOCUMENTS

| | | |
|---|---|---|
| 2,614,685 A | 10/1952 | Miller |
| 3,081,717 A | 3/1963 | Yurevich |
| 3,175,873 A | 3/1965 | Blomquist et al. |
| 3,212,192 A | 10/1965 | Bachmann et al. |
| 3,433,886 A | 3/1969 | Myers |
| 3,494,306 A | 2/1970 | Aguilar |
| 3,545,712 A | 12/1970 | Ellis |
| 3,568,263 A | 3/1971 | Meehan |
| 3,606,449 A * | 9/1971 | Whybrew et al. ............. 297/115 |
| 3,646,244 A | 2/1972 | Cole |
| 3,701,835 A | 10/1972 | Eisele et al. |
| 3,880,396 A | 4/1975 | Freiberger et al. |
| 3,906,592 A | 9/1975 | Sakasegawa et al. |
| 3,991,960 A | 11/1976 | Tanaka |
| 4,047,797 A | 9/1977 | Arnold et al. |
| 4,059,872 A | 11/1977 | Delesandri |
| 4,119,285 A | 10/1978 | Bisping et al. |
| 4,148,454 A | 4/1979 | Carlson et al. |
| 4,239,316 A | 12/1980 | Spaulding |
| 4,244,638 A | 1/1981 | Little et al. |
| 4,285,486 A | 8/1981 | Von Osten et al. |
| 4,303,296 A | 12/1981 | Spaulding |
| 4,354,731 A | 10/1982 | Mouissie |
| 4,457,482 A | 7/1984 | Kitagawa |
| 4,525,012 A | 6/1985 | Dunner |
| 4,540,222 A | 9/1985 | Burrell |
| 4,561,615 A | 12/1985 | Medlin, Jr. |
| 4,564,163 A | 1/1986 | Barnett |
| 4,597,173 A | 7/1986 | Chino et al. |
| 4,611,875 A | 9/1986 | Clarke et al. |
| 4,635,886 A | 1/1987 | Santucci et al. |
| 4,645,292 A | 2/1987 | Sammueller |
| 4,657,340 A | 4/1987 | Tanaka et al. |
| 4,681,288 A | 7/1987 | Nakamura |
| 4,702,551 A | 10/1987 | Coulombe |
| 4,711,518 A | 12/1987 | Shank et al. |
| 4,736,100 A | 4/1988 | Vastagh |
| 4,744,629 A | 5/1988 | Bertoglio et al. |
| 4,747,020 A | 5/1988 | Brickley et al. |
| 4,752,110 A | 6/1988 | Blanchet et al. |
| 4,753,510 A | 6/1988 | Sezerman |
| 4,787,706 A | 11/1988 | Cannon, Jr. et al. |
| 4,792,203 A | 12/1988 | Nelson et al. |
| 4,798,432 A | 1/1989 | Becker et al. |
| 4,805,979 A | 2/1989 | Bossard et al. |
| 4,808,774 A | 2/1989 | Crane |
| 4,824,193 A | 4/1989 | Maeda et al. |
| 4,824,196 A | 4/1989 | Bylander |
| 4,826,277 A | 5/1989 | Weber et al. |
| 4,838,643 A | 6/1989 | Hodges et al. |
| 4,840,449 A | 6/1989 | Ghandeharizadeh |
| 4,865,280 A | 9/1989 | Wollar |
| 4,898,448 A | 2/1990 | Cooper |
| 4,900,123 A | 2/1990 | Barlow |
| 4,911,662 A | 3/1990 | Debortoli et al. |
| 4,948,220 A | 8/1990 | Violo et al. |
| 4,949,376 A | 8/1990 | Nieves et al. |
| 4,971,421 A | 11/1990 | Ori |
| 4,986,625 A | 1/1991 | Yamada et al. |
| 4,988,831 A | 1/1991 | Wilson et al. |
| 4,991,928 A | 2/1991 | Zimmer |
| 4,995,688 A | 2/1991 | Anton et al. |
| 5,001,602 A | 3/1991 | Suffi et al. |
| 5,005,941 A | 4/1991 | Barlow et al. |
| 5,017,211 A | 5/1991 | Wenger et al. |
| 5,023,646 A | 6/1991 | Ishida et al. |
| 5,024,498 A | 6/1991 | Becker et al. |
| 5,028,114 A | 7/1991 | Krausse et al. |
| 5,037,175 A | 8/1991 | Weber |
| 5,048,918 A | 9/1991 | Daems et al. |
| 5,060,897 A | 10/1991 | Thalenfeld |
| 5,066,149 A | 11/1991 | Wheeler et al. |
| 5,067,784 A | 11/1991 | Debortoli et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,080,459 A | 1/1992 | Wettengel et al. |
| 5,100,221 A | 3/1992 | Carney et al. |
| 5,104,336 A | 4/1992 | Hatanaka et al. |
| 5,123,071 A | 6/1992 | Mulholland et al. |
| 5,125,060 A | 6/1992 | Edmundson |
| 5,127,082 A | 6/1992 | Below et al. |
| 5,127,851 A | 7/1992 | Hilbert et al. |
| 5,129,030 A | 7/1992 | Petrunia |
| 5,129,607 A | 7/1992 | Satoh |
| 5,133,039 A | 7/1992 | Dixit |
| 5,138,678 A | 8/1992 | Briggs et al. |
| 5,138,688 A | 8/1992 | Debortoli |
| 5,142,598 A | 8/1992 | Tabone |
| 5,142,607 A | 8/1992 | Petrotta et al. |
| 5,150,277 A | 9/1992 | Bainbridge et al. |
| D330,368 S | 10/1992 | Bourgeois et al. |
| 5,152,760 A | 10/1992 | Latina |
| 5,153,910 A | 10/1992 | Mickelson et al. |
| 5,157,749 A | 10/1992 | Briggs et al. |
| 5,167,001 A | 11/1992 | Debortoli et al. |
| 5,170,452 A | 12/1992 | Ott |
| 5,189,723 A | 2/1993 | Johnson et al. |
| 5,199,099 A | 3/1993 | Dalgoutte |
| 5,204,929 A | 4/1993 | Machall et al. |
| 5,209,572 A | 5/1993 | Jordan |
| 5,214,735 A | 5/1993 | Henneberger et al. |
| 5,224,186 A | 6/1993 | Kishimoto et al. |
| 5,230,492 A | 7/1993 | Zwart et al. |
| 5,231,687 A | 7/1993 | Handley |
| 5,231,688 A | 7/1993 | Zimmer |
| 5,233,674 A | 8/1993 | Vladic |
| 5,239,609 A | 8/1993 | Auteri |
| 5,243,679 A | 9/1993 | Sharrow et al. |
| 5,253,320 A | 10/1993 | Takahashi et al. |
| 5,260,957 A | 11/1993 | Hakimi et al. |
| 5,261,633 A | 11/1993 | Mastro |
| 5,265,187 A | 11/1993 | Morin et al. |
| 5,274,729 A | 12/1993 | King et al. |
| 5,274,731 A | 12/1993 | White |
| 5,278,933 A | 1/1994 | Hunsinger et al. |
| 5,280,138 A | 1/1994 | Preston et al. |
| 5,285,515 A | 2/1994 | Milanowski et al. |
| 5,291,570 A | 3/1994 | Filgas et al. |
| 5,315,679 A | 5/1994 | Baldwin et al. |
| 5,317,663 A | 5/1994 | Beard et al. |
| 5,323,478 A | 6/1994 | Milanowski et al. |
| 5,323,480 A | 6/1994 | Mullaney et al. |
| 5,329,520 A | 7/1994 | Richardson |
| 5,333,193 A | 7/1994 | Cote et al. |
| 5,333,221 A | 7/1994 | Briggs et al. |
| 5,333,222 A | 7/1994 | Belenkiy et al. |
| 5,337,400 A | 8/1994 | Morin et al. |
| 5,339,379 A | 8/1994 | Kutsch et al. |
| 5,347,603 A | 9/1994 | Belenkiy et al. |
| 5,353,367 A | 10/1994 | Czosnowski et al. |
| 5,359,688 A | 10/1994 | Underwood |
| 5,363,466 A | 11/1994 | Milanowski et al. |
| 5,363,467 A | 11/1994 | Keith |
| 5,366,388 A | 11/1994 | Freeman et al. |
| 5,367,598 A | 11/1994 | Devenish, III et al. |
| 5,373,421 A | 12/1994 | Detsikas et al. |
| 5,383,051 A | 1/1995 | Delrosso et al. |
| 5,390,272 A | 2/1995 | Repta et al. |
| 5,398,295 A | 3/1995 | Chang et al. |
| 5,398,820 A | 3/1995 | Kiss |
| 5,399,814 A | 3/1995 | Staber et al. |

(56) References Cited

U.S. PATENT DOCUMENTS

| | | | |
|---|---|---|---|
| 5,401,193 A | 3/1995 | Lo Cicero et al. | |
| 5,402,515 A * | 3/1995 | Vidacovich et al. | 385/135 |
| 5,408,557 A | 4/1995 | Hsu | |
| RE34,955 E | 5/1995 | Anton et al. | |
| 5,412,751 A | 5/1995 | Siemon et al. | |
| 5,416,837 A | 5/1995 | Cote et al. | |
| 5,418,874 A | 5/1995 | Carlisle et al. | |
| 5,420,956 A | 5/1995 | Grugel et al. | |
| 5,420,958 A | 5/1995 | Henson et al. | |
| 5,421,532 A | 6/1995 | Richter | |
| 5,438,641 A | 8/1995 | Malacarne | |
| 5,442,725 A | 8/1995 | Peng | |
| 5,442,726 A | 8/1995 | Howard et al. | |
| 5,443,232 A | 8/1995 | Kesinger et al. | |
| 5,444,804 A | 8/1995 | Yui et al. | |
| 5,448,015 A | 9/1995 | Jamet et al. | |
| 5,450,518 A | 9/1995 | Burek et al. | |
| 5,458,019 A | 10/1995 | Trevino | |
| 5,471,555 A | 11/1995 | Braga et al. | |
| 5,479,505 A | 12/1995 | Butler et al. | |
| 5,481,634 A | 1/1996 | Anderson et al. | |
| 5,481,939 A | 1/1996 | Bernardini | |
| 5,490,229 A | 2/1996 | Ghandeharizadeh et al. | |
| 5,497,416 A | 3/1996 | Butler, III et al. | |
| 5,497,444 A | 3/1996 | Wheeler | |
| 5,511,144 A | 4/1996 | Hawkins et al. | |
| 5,511,798 A | 4/1996 | Kawamoto et al. | |
| 5,519,804 A | 5/1996 | Burek et al. | |
| 5,530,786 A | 6/1996 | Radliff et al. | |
| 5,535,970 A | 7/1996 | Gobbi | |
| 5,538,213 A | 7/1996 | Brown | |
| 5,542,015 A | 7/1996 | Hultermans | |
| 5,546,495 A | 8/1996 | Bruckner et al. | |
| 5,548,641 A | 8/1996 | Butler et al. | |
| 5,553,183 A | 9/1996 | Bechamps | |
| 5,553,186 A | 9/1996 | Allen | |
| 5,563,971 A | 10/1996 | Abendschein | |
| 5,572,617 A | 11/1996 | Bernhardt et al. | |
| 5,575,680 A | 11/1996 | Suffi | |
| 5,577,151 A | 11/1996 | Hoffer | |
| 5,590,234 A | 12/1996 | Pulido | |
| 5,595,507 A | 1/1997 | Braun et al. | |
| 5,596,670 A | 1/1997 | Debortoli et al. | |
| 5,600,020 A | 2/1997 | Wehle et al. | |
| 5,602,954 A | 2/1997 | Nolf et al. | |
| 5,608,606 A | 3/1997 | Blaney | |
| 5,613,030 A | 3/1997 | Hoffer et al. | |
| 5,617,501 A | 4/1997 | Miller et al. | |
| 5,638,474 A | 6/1997 | Lampert et al. | |
| 5,640,476 A | 6/1997 | Womack et al. | |
| 5,640,482 A | 6/1997 | Barry et al. | |
| 5,647,043 A | 7/1997 | Anderson et al. | |
| 5,647,045 A | 7/1997 | Robinson et al. | |
| 5,650,334 A | 7/1997 | Zuk et al. | |
| 5,668,910 A | 9/1997 | Arnett | |
| 5,668,911 A | 9/1997 | Debortoli | |
| 5,671,273 A | 9/1997 | Lanquist | |
| 5,689,605 A | 11/1997 | Cobb et al. | |
| 5,689,606 A * | 11/1997 | Hassan | 385/135 |
| 5,689,607 A | 11/1997 | Vincent et al. | |
| 5,692,079 A | 11/1997 | Iso | |
| 5,694,511 A | 12/1997 | Pimpinella et al. | |
| 5,701,380 A | 12/1997 | Larson et al. | |
| 5,704,573 A | 1/1998 | de Beers et al. | |
| 5,708,742 A | 1/1998 | Beun et al. | |
| 5,708,751 A | 1/1998 | Mattei | |
| 5,710,851 A | 1/1998 | Walter et al. | |
| 5,717,810 A | 2/1998 | Wheeler | |
| 5,734,776 A | 3/1998 | Puetz | |
| 5,740,300 A | 4/1998 | Hodge | |
| 5,742,982 A | 4/1998 | Dodd et al. | |
| 5,751,874 A | 5/1998 | Chudoba et al. | |
| 5,751,882 A | 5/1998 | Daems et al. | |
| 5,754,724 A | 5/1998 | Peterson et al. | |
| 5,758,003 A | 5/1998 | Wheeler et al. | |
| 5,758,004 A | 5/1998 | Alarcon et al. | |
| 5,761,026 A | 6/1998 | Robinson et al. | |
| 5,765,698 A | 6/1998 | Bullivant | |
| 5,769,908 A | 6/1998 | Koppelman | |
| 5,774,612 A | 6/1998 | Belenkiy et al. | |
| 5,778,122 A | 7/1998 | Giebel et al. | |
| 5,778,130 A | 7/1998 | Walters et al. | |
| 5,781,686 A | 7/1998 | Robinson et al. | |
| 5,788,087 A | 8/1998 | Orlando | |
| 5,790,741 A | 8/1998 | Vincent et al. | |
| 5,793,920 A | 8/1998 | Wilkins et al. | |
| 5,793,921 A | 8/1998 | Wilkins et al. | |
| 5,796,908 A | 8/1998 | Vicory | |
| 5,823,646 A | 10/1998 | Arizpe et al. | |
| 5,825,955 A | 10/1998 | Ernst et al. | |
| 5,825,961 A | 10/1998 | Wilkins et al. | |
| 5,828,807 A | 10/1998 | Tucker et al. | |
| 5,832,162 A | 11/1998 | Sarbell | |
| 5,835,657 A | 11/1998 | Suarez et al. | |
| 5,835,658 A | 11/1998 | Smith | |
| 5,862,290 A | 1/1999 | Burek et al. | |
| 5,870,519 A | 2/1999 | Jenkins et al. | |
| 5,874,733 A | 2/1999 | Silver et al. | |
| 5,877,565 A | 3/1999 | Hollenbach et al. | |
| 5,880,864 A | 3/1999 | Williams et al. | |
| 5,881,200 A | 3/1999 | Burt | |
| 5,883,995 A | 3/1999 | Lu et al. | |
| 5,884,003 A | 3/1999 | Cloud et al. | |
| 5,887,095 A | 3/1999 | Nagase et al. | |
| 5,887,106 A | 3/1999 | Cheeseman et al. | |
| 5,892,877 A | 4/1999 | Meyerhoefer | |
| 5,894,540 A | 4/1999 | Drewing | |
| 5,901,220 A | 5/1999 | Garver et al. | |
| 5,903,693 A | 5/1999 | Brown | |
| 5,906,342 A | 5/1999 | Kraus | |
| 5,909,298 A | 6/1999 | Shimada et al. | |
| 5,913,006 A | 6/1999 | Summach | |
| 5,914,976 A | 6/1999 | Jayaraman et al. | |
| 5,915,055 A | 6/1999 | Bennett et al. | |
| 5,923,804 A | 7/1999 | Rosson | |
| 5,930,425 A | 7/1999 | Abel et al. | |
| 5,933,557 A | 8/1999 | Ott | |
| 5,940,563 A | 8/1999 | Kobayashi et al. | |
| 5,943,460 A | 8/1999 | Mead et al. | |
| 5,945,633 A | 8/1999 | Ott et al. | |
| 5,946,440 A | 8/1999 | Puetz | |
| 5,949,946 A | 9/1999 | Debortoli et al. | |
| 5,953,962 A | 9/1999 | Hewson | |
| 5,956,439 A | 9/1999 | Pimpinella | |
| 5,956,444 A | 9/1999 | Duda et al. | |
| 5,956,449 A | 9/1999 | Otani et al. | |
| 5,966,492 A | 10/1999 | Bechamps et al. | |
| 5,969,294 A | 10/1999 | Eberle et al. | |
| 5,975,769 A | 11/1999 | Larson et al. | |
| 5,978,540 A | 11/1999 | Bechamps et al. | |
| 5,980,303 A | 11/1999 | Lee et al. | |
| 5,993,071 A | 11/1999 | Hultermans | |
| 5,995,700 A | 11/1999 | Burek et al. | |
| 5,999,393 A | 12/1999 | Brower | |
| 6,001,831 A | 12/1999 | Papenfuhs et al. | |
| 6,009,224 A | 12/1999 | Allen | |
| 6,009,225 A * | 12/1999 | Ray et al. | 385/135 |
| 6,011,831 A | 1/2000 | Nieves et al. | |
| 6,027,252 A | 2/2000 | Erdman et al. | |
| 6,027,352 A | 2/2000 | Byrne | |
| 6,041,042 A | 3/2000 | Bussiere | |
| 6,044,193 A | 3/2000 | Szentesi et al. | |
| 6,058,235 A | 5/2000 | Hiramatsu et al. | |
| 6,061,492 A | 5/2000 | Strause et al. | |
| 6,078,661 A | 6/2000 | Arnett et al. | |
| 6,079,881 A | 6/2000 | Roth | |
| 6,088,497 A | 7/2000 | Phillips et al. | |
| 6,118,075 A | 9/2000 | Baker et al. | |
| 6,127,627 A | 10/2000 | Daoud | |
| 6,130,983 A | 10/2000 | Cheng | |
| 6,134,370 A | 10/2000 | Childers et al. | |
| 6,149,313 A | 11/2000 | Giebel et al. | |
| 6,149,315 A | 11/2000 | Stephenson | |
| 6,151,432 A | 11/2000 | Nakajima et al. | |

(56) References Cited

U.S. PATENT DOCUMENTS

| | | | |
|---|---|---|---|
| 6,160,946 A | 12/2000 | Thompson et al. | |
| 6,170,784 B1 | 1/2001 | MacDonald et al. | |
| 6,172,782 B1 | 1/2001 | Kobayashi | |
| 6,175,079 B1 | 1/2001 | Johnston et al. | |
| 6,181,861 B1 | 1/2001 | Wenski et al. | |
| 6,188,687 B1 | 2/2001 | Mussman et al. | |
| 6,188,825 B1 | 2/2001 | Bandy et al. | |
| 6,192,180 B1 | 2/2001 | Kim et al. | |
| 6,201,920 B1 | 3/2001 | Noble et al. | |
| 6,208,796 B1 | 3/2001 | Williams Vigliaturo | |
| 6,212,324 B1 | 4/2001 | Lin et al. | |
| 6,215,938 B1 | 4/2001 | Reitmeier et al. | |
| 6,216,987 B1 | 4/2001 | Fukuo | |
| 6,220,762 B1 | 4/2001 | Kanai et al. | |
| 6,227,717 B1 | 5/2001 | Ott et al. | |
| 6,229,948 B1 | 5/2001 | Blee et al. | |
| 6,234,683 B1 | 5/2001 | Waldron et al. | |
| 6,234,685 B1 | 5/2001 | Carlisle et al. | |
| 6,236,795 B1 | 5/2001 | Rodgers | |
| 6,240,229 B1 | 5/2001 | Roth | |
| 6,243,522 B1 | 6/2001 | Allan et al. | |
| 6,245,998 B1 | 6/2001 | Curry et al. | |
| 6,247,851 B1 | 6/2001 | Ichihara | |
| 6,259,850 B1 | 7/2001 | Crosby, Jr. et al. | |
| 6,263,141 B1 * | 7/2001 | Smith | 385/135 |
| 6,265,680 B1 | 7/2001 | Robertson | |
| 6,269,212 B1 | 7/2001 | Schiattone | |
| 6,273,532 B1 | 8/2001 | Chen et al. | |
| 6,275,641 B1 | 8/2001 | Daoud | |
| 6,278,829 B1 | 8/2001 | BuAbbud et al. | |
| 6,278,831 B1 | 8/2001 | Henderson et al. | |
| D448,005 S | 9/2001 | Klein, Jr. et al. | |
| 6,289,618 B1 | 9/2001 | Kump et al. | |
| 6,292,614 B1 | 9/2001 | Smith et al. | |
| 6,301,424 B1 | 10/2001 | Hwang | |
| 6,305,848 B1 | 10/2001 | Gregory | |
| 6,307,997 B1 | 10/2001 | Walters et al. | |
| 6,318,824 B1 | 11/2001 | LaGrotta et al. | |
| 6,321,017 B1 | 11/2001 | Janus et al. | |
| 6,322,279 B1 | 11/2001 | Yamamoto et al. | |
| 6,324,575 B1 | 11/2001 | Jain et al. | |
| 6,325,549 B1 | 12/2001 | Shevchuk | |
| 6,327,059 B1 | 12/2001 | Bhalla et al. | |
| RE37,489 E | 1/2002 | Anton et al. | |
| 6,343,313 B1 | 1/2002 | Salesky et al. | |
| 6,344,615 B1 | 2/2002 | Nolf et al. | |
| 6,347,888 B1 | 2/2002 | Puetz | |
| 6,353,696 B1 | 3/2002 | Gordon et al. | |
| 6,353,697 B1 | 3/2002 | Daoud | |
| 6,357,712 B1 | 3/2002 | Lu | |
| 6,359,228 B1 | 3/2002 | Strause et al. | |
| 6,360,050 B1 * | 3/2002 | Moua et al. | 385/135 |
| 6,363,198 B1 | 3/2002 | Braga et al. | |
| 6,363,200 B1 | 3/2002 | Thompson et al. | |
| 6,370,309 B1 | 4/2002 | Daoud | |
| 6,371,419 B1 | 4/2002 | Ohnuki | |
| 6,375,129 B2 | 4/2002 | Koziol | |
| 6,377,218 B1 | 4/2002 | Nelson et al. | |
| 6,379,052 B1 | 4/2002 | De Jong et al. | |
| 6,381,642 B1 | 4/2002 | O'Donnell et al. | |
| 6,385,374 B2 | 5/2002 | Kropp | |
| 6,385,381 B1 | 5/2002 | Janus et al. | |
| 6,389,214 B1 | 5/2002 | Smith et al. | |
| 6,397,166 B1 | 5/2002 | Leung et al. | |
| 6,398,149 B1 | 6/2002 | Hines et al. | |
| 6,406,314 B1 | 6/2002 | Byrne | |
| 6,411,767 B1 | 6/2002 | Burrous et al. | |
| 6,412,986 B1 | 7/2002 | Ngo et al. | |
| 6,418,262 B1 | 7/2002 | Puetz et al. | |
| 6,419,519 B1 | 7/2002 | Young | |
| 6,424,781 B1 | 7/2002 | Puetz et al. | |
| 6,425,694 B1 | 7/2002 | Szilagyi et al. | |
| 6,427,045 B1 | 7/2002 | Matthes et al. | |
| 6,431,762 B1 | 8/2002 | Taira et al. | |
| 6,434,313 B1 | 8/2002 | Clapp, Jr. et al. | |
| 6,438,310 B1 * | 8/2002 | Lance et al. | 385/135 |
| 6,452,925 B1 | 9/2002 | Sistanizadeh et al. | |
| 6,456,773 B1 | 9/2002 | Keys | |
| 6,464,402 B1 | 10/2002 | Andrews et al. | |
| 6,466,724 B1 | 10/2002 | Glover et al. | |
| 6,469,905 B1 | 10/2002 | Hwang | |
| D466,087 S | 11/2002 | Cuny et al. | |
| 6,478,472 B1 | 11/2002 | Anderson et al. | |
| 6,480,487 B1 | 11/2002 | Wegleitner et al. | |
| 6,480,660 B1 | 11/2002 | Reitmeier et al. | |
| 6,483,977 B2 | 11/2002 | Battey et al. | |
| 6,484,958 B1 | 11/2002 | Xue et al. | |
| 6,494,550 B1 | 12/2002 | Chen et al. | |
| 6,496,640 B1 | 12/2002 | Harvey et al. | |
| 6,504,988 B1 | 1/2003 | Trebesch et al. | |
| 6,507,980 B2 | 1/2003 | Bremicker | |
| 6,510,274 B1 | 1/2003 | Wu et al. | |
| 6,532,332 B2 | 3/2003 | Solheid et al. | |
| 6,533,472 B1 | 3/2003 | Dinh et al. | |
| 6,535,397 B2 | 3/2003 | Clark et al. | |
| 6,539,147 B1 | 3/2003 | Mahony | |
| 6,539,160 B2 | 3/2003 | Battey et al. | |
| 6,542,688 B1 | 4/2003 | Battey et al. | |
| 6,544,075 B1 | 4/2003 | Liao | |
| 6,550,977 B2 | 4/2003 | Hizuka | |
| 6,554,485 B1 | 4/2003 | Beatty et al. | |
| 6,560,334 B1 | 5/2003 | Mullaney et al. | |
| 6,567,601 B2 | 5/2003 | Daoud et al. | |
| 6,568,542 B1 | 5/2003 | Chen | |
| 6,571,048 B1 | 5/2003 | Bechamps et al. | |
| 6,577,595 B1 | 6/2003 | Counterman | |
| 6,577,801 B2 | 6/2003 | Broderick et al. | |
| 6,579,014 B2 | 6/2003 | Melton et al. | |
| 6,584,267 B1 | 6/2003 | Caveney et al. | |
| 6,585,423 B1 | 7/2003 | Vergeest | |
| 6,587,630 B2 | 7/2003 | Spence et al. | |
| 6,588,938 B1 | 7/2003 | Lampert et al. | |
| 6,591,051 B2 | 7/2003 | Solheid et al. | |
| 6,591,053 B2 | 7/2003 | Fritz | |
| 6,592,266 B1 | 7/2003 | Hankins et al. | |
| 6,597,670 B1 | 7/2003 | Tweedy et al. | |
| 6,600,106 B2 | 7/2003 | Standish et al. | |
| 6,600,866 B2 | 7/2003 | Gatica et al. | |
| 6,601,997 B2 | 8/2003 | Ngo | |
| 6,612,515 B1 | 9/2003 | Tinucci et al. | |
| 6,612,874 B1 | 9/2003 | Stout et al. | |
| 6,614,978 B1 | 9/2003 | Caveney | |
| 6,614,980 B1 | 9/2003 | Mahony | |
| 6,621,975 B2 | 9/2003 | Laporte et al. | |
| 6,622,873 B2 | 9/2003 | Hegrenes et al. | |
| 6,624,389 B1 | 9/2003 | Cox | |
| 6,625,374 B2 | 9/2003 | Holman et al. | |
| 6,625,375 B1 | 9/2003 | Mahony | |
| 6,631,237 B2 | 10/2003 | Knudsen et al. | |
| 6,640,042 B2 | 10/2003 | Araki et al. | |
| RE38,311 E | 11/2003 | Wheeler | |
| 6,644,863 B1 | 11/2003 | Azami et al. | |
| 6,647,197 B1 | 11/2003 | Marrs et al. | |
| 6,648,520 B2 | 11/2003 | McDonald et al. | |
| 6,654,536 B2 | 11/2003 | Battey et al. | |
| 6,661,650 B2 * | 12/2003 | Nakajima et al. | 361/679.09 |
| 6,668,127 B1 | 12/2003 | Mahony | |
| 6,669,149 B2 | 12/2003 | Akizuki | |
| 6,677,520 B1 | 1/2004 | Kim et al. | |
| 6,679,604 B1 | 1/2004 | Bove et al. | |
| 6,687,450 B1 | 2/2004 | Kempeneers et al. | |
| 6,693,552 B1 | 2/2004 | Herzig et al. | |
| 6,695,620 B1 | 2/2004 | Huang | |
| 6,701,056 B2 | 3/2004 | Burek et al. | |
| 6,710,366 B1 | 3/2004 | Lee et al. | |
| 6,715,619 B2 | 4/2004 | Kim et al. | |
| 6,719,149 B2 | 4/2004 | Tomino | |
| 6,721,482 B1 | 4/2004 | Glynn | |
| 6,731,851 B2 * | 5/2004 | Sato et al. | 385/135 |
| 6,741,784 B1 | 5/2004 | Guan | |
| 6,741,785 B2 | 5/2004 | Barthel et al. | |
| 6,746,037 B1 | 6/2004 | Kaplenski et al. | |
| 6,748,154 B2 | 6/2004 | O'Leary et al. | |
| 6,748,155 B2 | 6/2004 | Kim et al. | |

(56) References Cited

U.S. PATENT DOCUMENTS

| | | |
|---|---|---|
| 6,758,600 B2 | 7/2004 | Del Grosso et al. |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,786,743 B2 | 9/2004 | Huang |
| 6,786,896 B1 | 9/2004 | Madhani et al. |
| 6,788,871 B2 | 9/2004 | Taylor |
| 6,792,190 B2 | 9/2004 | Xin et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 | 11/2004 | Nashimoto |
| 6,818,834 B1 | 11/2004 | Lin |
| 6,819,856 B2 | 11/2004 | Dagley et al. |
| 6,819,857 B2 * | 11/2004 | Douglas et al. ............... 385/135 |
| 6,822,874 B1 | 11/2004 | Marler |
| 6,826,174 B1 | 11/2004 | Erekson et al. |
| 6,826,346 B2 | 11/2004 | Sloan et al. |
| 6,826,631 B2 | 11/2004 | Webb |
| 6,830,489 B2 | 12/2004 | Aoyama |
| 6,839,428 B2 | 1/2005 | Brower et al. |
| 6,839,438 B1 | 1/2005 | Riegelsberger et al. |
| 6,840,815 B2 | 1/2005 | Musolf et al. |
| 6,845,207 B2 | 1/2005 | Schray |
| 6,847,614 B2 | 1/2005 | Banker et al. |
| 6,848,862 B1 | 2/2005 | Schlig |
| 6,850,685 B2 | 2/2005 | Tinucci et al. |
| 6,853,637 B1 | 2/2005 | Norrell et al. |
| 6,854,894 B1 | 2/2005 | Yunker et al. |
| 6,856,334 B1 | 2/2005 | Fukui |
| 6,863,444 B2 | 3/2005 | Anderson et al. |
| 6,863,446 B2 | 3/2005 | Ngo |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B1 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke |
| 6,879,545 B2 | 4/2005 | Cooke et al. |
| 6,915,058 B2 | 7/2005 | Pons |
| 6,920,273 B2 | 7/2005 | Knudsen |
| 6,920,274 B2 | 7/2005 | Rapp et al. |
| 6,923,406 B2 | 8/2005 | Akizuki |
| 6,925,241 B2 | 8/2005 | Bohle et al. |
| 6,934,451 B2 | 8/2005 | Cooke et al. |
| 6,934,456 B2 | 8/2005 | Ferris et al. |
| 6,935,598 B2 | 8/2005 | Sono et al. |
| 6,937,807 B2 | 8/2005 | Franklin et al. |
| 6,944,383 B1 | 9/2005 | Herzog et al. |
| 6,944,389 B1 | 9/2005 | Giraud et al. |
| 6,945,701 B2 | 9/2005 | Trezza et al. |
| 6,952,530 B2 | 10/2005 | Helvajian et al. |
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,985,665 B2 | 1/2006 | Baechtle |
| 6,993,237 B2 | 1/2006 | Cooke et al. |
| 7,000,784 B2 | 2/2006 | Canty et al. |
| 7,005,582 B2 | 2/2006 | Muller et al. |
| 7,006,748 B2 | 2/2006 | Dagley et al. |
| 7,007,296 B2 | 2/2006 | Rakib |
| 7,025,275 B2 | 4/2006 | Huang et al. |
| 7,027,695 B2 | 4/2006 | Cooke et al. |
| 7,027,706 B2 | 4/2006 | Diaz et al. |
| 7,031,588 B2 | 4/2006 | Cowley et al. |
| 7,035,510 B2 | 4/2006 | Zimmel et al. |
| 7,038,137 B2 | 5/2006 | Grubish et al. |
| 7,048,447 B1 | 5/2006 | Patel et al. |
| 7,054,513 B2 | 5/2006 | Herz et al. |
| 7,066,748 B2 | 6/2006 | Bricaud et al. |
| 7,068,907 B2 | 6/2006 | Schray |
| 7,070,459 B2 | 7/2006 | Denovich et al. |
| 7,077,710 B2 | 7/2006 | Haggay et al. |
| 7,079,744 B2 | 7/2006 | Douglas et al. |
| 7,088,893 B2 | 8/2006 | Cooke et al. |
| 7,090,406 B2 | 8/2006 | Melton et al. |
| 7,090,407 B2 | 8/2006 | Melton et al. |
| 7,094,095 B1 | 8/2006 | Caveney |
| 7,097,047 B2 | 8/2006 | Lee et al. |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,491 B1 | 10/2006 | Willey et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |
| 7,120,348 B2 | 10/2006 | Trebesch et al. |
| 7,120,349 B2 | 10/2006 | Elliott |
| 7,127,143 B2 | 10/2006 | Elkins, II et al. |
| 7,128,471 B2 | 10/2006 | Wilson |
| 7,136,555 B2 | 11/2006 | Theuerkorn et al. |
| 7,139,462 B1 | 11/2006 | Richtman |
| 7,140,903 B2 | 11/2006 | Pulizzi et al. |
| 7,147,383 B2 | 12/2006 | Sullivan |
| 7,170,466 B2 | 1/2007 | Janoschka |
| 7,171,099 B2 | 1/2007 | Barnes et al. |
| 7,171,100 B2 * | 1/2007 | Solheid et al. ............... 385/135 |
| 7,171,121 B1 | 1/2007 | Skarica et al. |
| 7,181,142 B1 | 2/2007 | Xu et al. |
| 7,186,134 B2 | 3/2007 | Togami et al. |
| 7,193,783 B2 | 3/2007 | Willey et al. |
| 7,194,181 B2 | 3/2007 | Holmberg et al. |
| 7,195,521 B2 | 3/2007 | Musolf et al. |
| 7,200,314 B2 | 4/2007 | Womack et al. |
| 7,200,316 B2 | 4/2007 | Giraud et al. |
| 7,201,595 B1 | 4/2007 | Morello |
| 7,217,040 B2 | 5/2007 | Crews et al. |
| 7,218,526 B2 | 5/2007 | Mayer |
| 7,220,065 B2 | 5/2007 | Han et al. |
| 7,220,145 B2 | 5/2007 | Denovich et al. |
| 7,221,832 B2 | 5/2007 | Tinucci |
| 7,228,036 B2 | 6/2007 | Elkins, II et al. |
| 7,228,047 B1 | 6/2007 | Szilagyi et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,239,789 B2 | 7/2007 | Grubish et al. |
| 7,245,809 B1 | 7/2007 | Gniadek et al. |
| 7,259,325 B2 | 8/2007 | Pincu et al. |
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,280,733 B2 | 10/2007 | Larson et al. |
| 7,284,785 B2 | 10/2007 | Gotou et al. |
| 7,287,913 B2 | 10/2007 | Keenum et al. |
| 7,289,731 B2 | 10/2007 | Thinguldstad |
| 7,292,769 B2 | 11/2007 | Watanabe et al. |
| 7,295,747 B2 * | 11/2007 | Solheid et al. ............... 385/135 |
| 7,298,950 B2 | 11/2007 | Frohlich |
| 7,300,216 B2 | 11/2007 | Morse et al. |
| 7,300,308 B2 | 11/2007 | Laursen et al. |
| 7,302,149 B2 | 11/2007 | Swam et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,310,471 B2 | 12/2007 | Bayazit et al. |
| 7,310,472 B2 | 12/2007 | Haberman |
| 7,315,681 B2 | 1/2008 | Kewitsch |
| 7,325,975 B2 | 2/2008 | Yamada et al. |
| 7,330,624 B2 | 2/2008 | Isenhour et al. |
| 7,330,625 B2 | 2/2008 | Barth |
| 7,330,626 B2 | 2/2008 | Kowalczyk et al. |

(56) References Cited

U.S. PATENT DOCUMENTS

| | | | |
|---|---|---|---|
| 7,330,629 B2 | 2/2008 | Cooke et al. | |
| 7,331,718 B2 | 2/2008 | Yazaki et al. | |
| 7,340,145 B2 | 3/2008 | Allen | |
| 7,349,615 B2 | 3/2008 | Frazier et al. | |
| 7,352,946 B2 | 4/2008 | Heller et al. | |
| 7,352,947 B2 | 4/2008 | Phung et al. | |
| 7,373,071 B2 | 5/2008 | Douglas et al. | |
| 7,376,321 B2 | 5/2008 | Bolster et al. | |
| 7,376,323 B2 | 5/2008 | Zimmel | |
| 7,391,952 B1 | 6/2008 | Ugolini et al. | |
| 7,397,996 B2 | 7/2008 | Herzog et al. | |
| 7,400,813 B2 | 7/2008 | Zimmel | |
| 7,404,736 B2 | 7/2008 | Herbst et al. | |
| 7,409,137 B2 | 8/2008 | Barnes | |
| 7,414,198 B2 | 8/2008 | Stansbie et al. | |
| 7,417,188 B2 | 8/2008 | McNutt et al. | |
| 7,418,182 B2 | 8/2008 | Krampotich | |
| 7,418,184 B1 | 8/2008 | Gonzales et al. | |
| 7,421,182 B2 | 9/2008 | Bayazit et al. | |
| 7,428,363 B2 | 9/2008 | Leon et al. | |
| 7,435,090 B1 | 10/2008 | Schriefer et al. | |
| 7,437,049 B2 | 10/2008 | Krampotich | |
| 7,439,453 B2 | 10/2008 | Murano et al. | |
| 7,454,113 B2 | 11/2008 | Barnes | |
| 7,460,757 B2 | 12/2008 | Hoehne et al. | |
| 7,460,758 B2 | 12/2008 | Xin | |
| 7,461,981 B2 | 12/2008 | Yow, Jr. et al. | |
| 7,462,779 B2 | 12/2008 | Caveney et al. | |
| 7,463,810 B2 | 12/2008 | Bayazit et al. | |
| 7,463,811 B2 | 12/2008 | Trebesch et al. | |
| 7,469,090 B2 | 12/2008 | Ferris et al. | |
| 7,471,867 B2 | 12/2008 | Vogel et al. | |
| 7,474,828 B2 | 1/2009 | Leon et al. | |
| 7,477,824 B2 | 1/2009 | Reagan et al. | |
| 7,477,826 B2 | 1/2009 | Mullaney et al. | |
| 7,480,438 B2 | 1/2009 | Douglas et al. | |
| 7,488,205 B2 | 2/2009 | Spisany et al. | |
| 7,493,002 B2 | 2/2009 | Coburn et al. | |
| 7,496,269 B1 | 2/2009 | Lee | |
| 7,499,622 B2 | 3/2009 | Castonguay et al. | |
| 7,499,623 B2 | 3/2009 | Barnes et al. | |
| 7,506,923 B1* | 3/2009 | Gauss | 297/150 |
| 7,507,111 B2 | 3/2009 | Togami et al. | |
| 7,509,015 B2 | 3/2009 | Murano | |
| 7,509,016 B2 | 3/2009 | Smith et al. | |
| 7,510,421 B2 | 3/2009 | Fransen et al. | |
| 7,522,804 B2 | 4/2009 | Araki et al. | |
| 7,523,898 B1 | 4/2009 | Barry et al. | |
| 7,526,171 B2 | 4/2009 | Caveney et al. | |
| 7,526,172 B2 | 4/2009 | Gniadek et al. | |
| 7,526,174 B2 | 4/2009 | Leon et al. | |
| 7,529,458 B2 | 5/2009 | Spisany et al. | |
| 7,534,958 B2 | 5/2009 | McNutt et al. | |
| 7,536,075 B2 | 5/2009 | Zimmel | |
| 7,540,666 B2 | 6/2009 | Luther et al. | |
| 7,542,645 B1 | 6/2009 | Hua et al. | |
| 7,544,085 B2 | 6/2009 | Baldwin et al. | |
| 7,552,899 B2 | 6/2009 | Chen et al. | |
| 7,555,193 B2 | 6/2009 | Rapp et al. | |
| 7,558,458 B2 | 7/2009 | Gronvall et al. | |
| 7,565,051 B2 | 7/2009 | Vongseng | |
| 7,567,744 B2 | 7/2009 | Krampotich et al. | |
| 7,570,860 B2 | 8/2009 | Smrha et al. | |
| 7,570,861 B2 | 8/2009 | Smrha et al. | |
| 7,577,331 B2 | 8/2009 | Laurisch et al. | |
| 7,596,293 B2 | 9/2009 | Isenhour et al. | |
| 7,603,020 B1 | 10/2009 | Wakileh et al. | |
| 7,607,938 B2 | 10/2009 | Clark et al. | |
| 7,609,967 B2 | 10/2009 | Hochbaum et al. | |
| 7,613,377 B2 | 11/2009 | Gonzales et al. | |
| 7,614,903 B1 | 11/2009 | Huang | |
| 7,620,287 B2 | 11/2009 | Appenzeller et al. | |
| 7,641,398 B2 | 1/2010 | O'Riorden et al. | |
| 7,668,430 B2 | 2/2010 | McClellan et al. | |
| 7,668,433 B2 | 2/2010 | Bayazit et al. | |
| 7,672,561 B1 | 3/2010 | Keith et al. | |
| 7,676,135 B2 | 3/2010 | Chen | |
| 7,689,079 B2 | 3/2010 | Burnham et al. | |
| 7,694,926 B2 | 4/2010 | Allen et al. | |
| 7,697,811 B2 | 4/2010 | Murano et al. | |
| 7,706,294 B2 | 4/2010 | Natarajan et al. | |
| 7,715,125 B2 | 5/2010 | Willey | |
| 7,715,683 B2 | 5/2010 | Kowalczyk et al. | |
| 7,734,138 B2 | 6/2010 | Bloodworth et al. | |
| 7,740,409 B2 | 6/2010 | Bolton et al. | |
| 7,743,495 B2 | 6/2010 | Mori et al. | |
| 7,751,674 B2 | 7/2010 | Hill | |
| 7,751,675 B2 | 7/2010 | Holmberg et al. | |
| 7,756,371 B1 | 7/2010 | Burnham et al. | |
| 7,756,382 B2 | 7/2010 | Saravanos et al. | |
| 7,760,984 B2 | 7/2010 | Solheid et al. | |
| 7,764,858 B2 | 7/2010 | Bayazit et al. | |
| 7,764,859 B2 | 7/2010 | Krampotich et al. | |
| 7,769,266 B2 | 8/2010 | Morris | |
| 7,805,044 B2 | 9/2010 | Reagan et al. | |
| 7,809,235 B2 | 10/2010 | Reagan et al. | |
| 7,811,136 B1 | 10/2010 | Hsieh et al. | |
| 7,822,310 B2 | 10/2010 | Castonguay et al. | |
| 7,837,495 B2 | 11/2010 | Baldwin et al. | |
| 7,850,372 B2 | 12/2010 | Nishimura et al. | |
| 7,853,112 B2 | 12/2010 | Zimmel et al. | |
| 7,856,166 B2 | 12/2010 | Biribuze et al. | |
| 7,862,369 B2 | 1/2011 | Gimenes et al. | |
| 7,869,685 B2 | 1/2011 | Hendrickson et al. | |
| 7,871,203 B2 | 1/2011 | Iwaya | |
| 7,876,580 B2 | 1/2011 | Mayer | |
| 7,899,298 B2 | 3/2011 | Cox et al. | |
| 7,914,332 B2 | 3/2011 | Song et al. | |
| 7,942,589 B2 | 5/2011 | Yazaki et al. | |
| 7,945,135 B2 | 5/2011 | Cooke et al. | |
| 7,945,136 B2 | 5/2011 | Cooke et al. | |
| 7,945,138 B2 | 5/2011 | Hill et al. | |
| 7,970,249 B2* | 6/2011 | Solheid et al. | 385/135 |
| 7,970,250 B2 | 6/2011 | Morris | |
| 7,991,252 B2 | 8/2011 | Cheng et al. | |
| 8,009,959 B2 | 8/2011 | Barnes et al. | |
| 8,014,171 B2 | 9/2011 | Kelly et al. | |
| 8,014,646 B2 | 9/2011 | Keith et al. | |
| 8,020,813 B1 | 9/2011 | Clark et al. | |
| 8,059,932 B2 | 11/2011 | Hill et al. | |
| 8,093,499 B2 | 1/2012 | Hoffer et al. | |
| 8,107,785 B2 | 1/2012 | Berglund et al. | |
| 8,131,126 B2 | 3/2012 | Kowalczyk et al. | |
| 8,184,938 B2 | 5/2012 | Cooke et al. | |
| 8,206,043 B2 | 6/2012 | Thirugnanam et al. | |
| 8,206,058 B2 | 6/2012 | Vrondran et al. | |
| 8,220,881 B2 | 7/2012 | Keith | |
| 8,226,305 B2 | 7/2012 | Thirugnanam et al. | |
| 8,249,410 B2 | 8/2012 | Andrus et al. | |
| 8,251,591 B2 | 8/2012 | Barnes et al. | |
| 8,267,472 B2* | 9/2012 | Large et al. | 297/217.3 |
| 8,270,798 B2 | 9/2012 | Dagley et al. | |
| 8,280,216 B2 | 10/2012 | Cooke et al. | |
| 8,285,104 B2 | 10/2012 | Davis et al. | |
| 8,290,332 B2 | 10/2012 | Mudd | |
| 8,301,004 B2 | 10/2012 | Cooke et al. | |
| 8,331,752 B2 | 12/2012 | Biribuze | |
| 8,353,494 B2 | 1/2013 | Peng et al. | |
| 8,369,679 B2 | 2/2013 | Wakileh et al. | |
| 8,391,666 B2 | 3/2013 | Hetzer et al. | |
| 8,472,773 B2 | 6/2013 | de Jong | |
| 8,491,331 B2 | 7/2013 | Follingstad | |
| 8,528,872 B2 | 9/2013 | Mattlin et al. | |
| 8,537,477 B2 | 9/2013 | Shioda | |
| 8,538,226 B2 | 9/2013 | Makrides-Saravanos et al. | |
| 8,559,783 B2 | 10/2013 | Campos et al. | |
| 8,873,925 B2* | 10/2014 | Lavoie et al. | 385/135 |
| 2001/0001270 A1 | 5/2001 | Williams Vigliaturo | |
| 2001/0010741 A1 | 8/2001 | Hizuka | |
| 2001/0029125 A1 | 10/2001 | Morita et al. | |
| 2002/0010818 A1 | 1/2002 | Wei et al. | |
| 2002/0012353 A1 | 1/2002 | Gerszberg et al. | |
| 2002/0028055 A1 | 3/2002 | Shibutani et al. | |
| 2002/0034290 A1 | 3/2002 | Pershan | |

(56) References Cited

U.S. PATENT DOCUMENTS

| | | |
|---|---|---|
| 2002/0037139 A1 | 3/2002 | Asao et al. |
| 2002/0064364 A1 | 5/2002 | Battey et al. |
| 2002/0131730 A1 | 9/2002 | Keeble et al. |
| 2002/0136519 A1 | 9/2002 | Tinucci et al. |
| 2002/0141724 A1 | 10/2002 | Ogawa et al. |
| 2002/0150372 A1 | 10/2002 | Schray |
| 2002/0172467 A1 | 11/2002 | Anderson et al. |
| 2002/0180163 A1 | 12/2002 | Muller et al. |
| 2002/0181918 A1 | 12/2002 | Spence et al. |
| 2002/0181922 A1 | 12/2002 | Xin et al. |
| 2002/0191939 A1 | 12/2002 | Daoud et al. |
| 2002/0194596 A1 | 12/2002 | Srivastava |
| 2003/0002802 A1 | 1/2003 | Trezza et al. |
| 2003/0007743 A1 | 1/2003 | Asada |
| 2003/0007767 A1 | 1/2003 | Douglas et al. |
| 2003/0011855 A1 | 1/2003 | Fujiwara |
| 2003/0021539 A1 | 1/2003 | Kwon et al. |
| 2003/0036748 A1 | 2/2003 | Cooper et al. |
| 2003/0051026 A1 | 3/2003 | Carter et al. |
| 2003/0066998 A1 | 4/2003 | Lee |
| 2003/0072551 A1* | 4/2003 | Douglas et al. ............... 385/135 |
| 2003/0086675 A1 | 5/2003 | Wu et al. |
| 2003/0095753 A1 | 5/2003 | Wada et al. |
| 2003/0147604 A1 | 8/2003 | Tapia et al. |
| 2003/0156552 A1 | 8/2003 | Banker et al. |
| 2003/0174996 A1 | 9/2003 | Henschel et al. |
| 2003/0180004 A1 | 9/2003 | Cox et al. |
| 2003/0180012 A1 | 9/2003 | Deane et al. |
| 2003/0183413 A1 | 10/2003 | Kato |
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2003/0223725 A1 | 12/2003 | Laporte et al. |
| 2003/0235387 A1 | 12/2003 | Dufour |
| 2004/0001717 A1 | 1/2004 | Bennett et al. |
| 2004/0013389 A1 | 1/2004 | Taylor |
| 2004/0013390 A1 | 1/2004 | Kim et al. |
| 2004/0022494 A1 | 2/2004 | Liddle et al. |
| 2004/0024934 A1 | 2/2004 | Webb |
| 2004/0067036 A1 | 4/2004 | Clark et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0120679 A1 | 6/2004 | Vincent et al. |
| 2004/0147159 A1 | 7/2004 | Urban et al. |
| 2004/0151465 A1 | 8/2004 | Krampotich et al. |
| 2004/0175090 A1 | 9/2004 | Vastmans et al. |
| 2004/0192115 A1 | 9/2004 | Bugg |
| 2004/0196841 A1 | 10/2004 | Tudor et al. |
| 2004/0208459 A1 | 10/2004 | Mizue et al. |
| 2004/0228598 A1 | 11/2004 | Allen et al. |
| 2004/0240827 A1 | 12/2004 | Daoud et al. |
| 2004/0240882 A1 | 12/2004 | Lipski et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0026497 A1 | 2/2005 | Holliday |
| 2005/0036749 A1 | 2/2005 | Vogel et al. |
| 2005/0067358 A1 | 3/2005 | Lee et al. |
| 2005/0069248 A1 | 3/2005 | Jasti et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0107086 A1 | 5/2005 | Tell et al. |
| 2005/0111800 A1 | 5/2005 | Cooke et al. |
| 2005/0111809 A1 | 5/2005 | Giraud et al. |
| 2005/0123261 A1 | 6/2005 | Bellekens et al. |
| 2005/0129379 A1 | 6/2005 | Reagan et al. |
| 2005/0178573 A1 | 8/2005 | James |
| 2005/0185910 A1 | 8/2005 | Zimmel |
| 2005/0201073 A1 | 9/2005 | Pincu et al. |
| 2005/0232550 A1 | 10/2005 | Nakajima et al. |
| 2005/0232566 A1 | 10/2005 | Rapp et al. |
| 2005/0233647 A1 | 10/2005 | Denovich et al. |
| 2005/0254757 A1 | 11/2005 | Ferretti, III et al. |
| 2005/0281526 A1 | 12/2005 | Vongseng et al. |
| 2005/0285493 A1 | 12/2005 | Hu et al. |
| 2006/0007562 A1 | 1/2006 | Willey et al. |
| 2006/0018448 A1 | 1/2006 | Stevens et al. |
| 2006/0018622 A1 | 1/2006 | Caveney et al. |
| 2006/0034048 A1 | 2/2006 | Xu |
| 2006/0039290 A1 | 2/2006 | Roden et al. |
| 2006/0044774 A1 | 3/2006 | Vasavda et al. |
| 2006/0045458 A1 | 3/2006 | Sasaki et al. |
| 2006/0072606 A1 | 4/2006 | Posthuma |
| 2006/0077968 A1 | 4/2006 | Pitsoulakis et al. |
| 2006/0093302 A1* | 5/2006 | Solheid et al. ............... 385/135 |
| 2006/0093303 A1 | 5/2006 | Reagan et al. |
| 2006/0127026 A1 | 6/2006 | Beck |
| 2006/0133736 A1 | 6/2006 | Sullivan |
| 2006/0133759 A1 | 6/2006 | Mullaney et al. |
| 2006/0147172 A1 | 7/2006 | Luther et al. |
| 2006/0153517 A1 | 7/2006 | Reagan et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0204179 A1 | 9/2006 | Patel et al. |
| 2006/0215980 A1 | 9/2006 | Bayazit et al. |
| 2006/0225912 A1 | 10/2006 | Clark et al. |
| 2006/0228087 A1 | 10/2006 | Bayazit et al. |
| 2006/0269194 A1 | 11/2006 | Luther et al. |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1 | 12/2006 | Ferris et al. |
| 2007/0003204 A1 | 1/2007 | Makrides-Saravanos et al. |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047894 A1* | 3/2007 | Holmberg et al. ............ 385/135 |
| 2007/0058641 A1 | 3/2007 | Cicchetti et al. |
| 2007/0086723 A1 | 4/2007 | Sasaki et al. |
| 2007/0092195 A1* | 4/2007 | Solheid et al. ............... 385/135 |
| 2007/0104447 A1 | 5/2007 | Allen |
| 2007/0110373 A1 | 5/2007 | Dudek et al. |
| 2007/0131628 A1 | 6/2007 | Mimlitch, III et al. |
| 2007/0183732 A1 | 8/2007 | Wittmeier et al. |
| 2007/0189692 A1 | 8/2007 | Zimmel et al. |
| 2007/0196071 A1 | 8/2007 | Laursen et al. |
| 2007/0221793 A1 | 9/2007 | Kusuda et al. |
| 2007/0237484 A1 | 10/2007 | Reagan et al. |
| 2007/0257159 A1 | 11/2007 | Nelson et al. |
| 2007/0266192 A1 | 11/2007 | Campini et al. |
| 2007/0274718 A1 | 11/2007 | Bridges et al. |
| 2008/0011514 A1 | 1/2008 | Zheng et al. |
| 2008/0025683 A1 | 1/2008 | Murano |
| 2008/0031585 A1 | 2/2008 | Solheid et al. |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0069513 A1 | 3/2008 | Desanti |
| 2008/0078899 A1 | 4/2008 | Chen et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085094 A1 | 4/2008 | Krampotich |
| 2008/0089656 A1 | 4/2008 | Wagner et al. |
| 2008/0095502 A1 | 4/2008 | McColloch |
| 2008/0095541 A1 | 4/2008 | Dallesasse |
| 2008/0100440 A1 | 5/2008 | Downie et al. |
| 2008/0106871 A1 | 5/2008 | James |
| 2008/0112681 A1 | 5/2008 | Battey et al. |
| 2008/0118207 A1 | 5/2008 | Yamamoto et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145013 A1 | 6/2008 | Escoto et al. |
| 2008/0152294 A1 | 6/2008 | Hirano et al. |

(56) References Cited

U.S. PATENT DOCUMENTS

| | | |
|---|---|---|
| 2008/0166094 A1 | 7/2008 | Bookbinder et al. |
| 2008/0166131 A1 | 7/2008 | Hudgins et al. |
| 2008/0175550 A1 | 7/2008 | Coburn et al. |
| 2008/0175551 A1 | 7/2008 | Smrha et al. |
| 2008/0175552 A1 | 7/2008 | Smrha et al. |
| 2008/0193091 A1 | 8/2008 | Herbst |
| 2008/0205823 A1 | 8/2008 | Luther et al. |
| 2008/0205843 A1 | 8/2008 | Castonguay et al. |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0247723 A1 | 10/2008 | Herzog et al. |
| 2008/0260344 A1 | 10/2008 | Smith et al. |
| 2008/0260345 A1 | 10/2008 | Mertesdorf et al. |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0296060 A1 | 12/2008 | Hawley et al. |
| 2008/0298763 A1 | 12/2008 | Appenzeller et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022467 A1 | 1/2009 | Puetz et al. |
| 2009/0022470 A1 | 1/2009 | Krampotich |
| 2009/0038845 A1 | 2/2009 | Fransen et al. |
| 2009/0060439 A1 | 3/2009 | Cox et al. |
| 2009/0060440 A1 | 3/2009 | Wright et al. |
| 2009/0067800 A1* | 3/2009 | Vazquez et al. ............ 385/135 |
| 2009/0074371 A1 | 3/2009 | Bayazit et al. |
| 2009/0080849 A1 | 3/2009 | Hankins et al. |
| 2009/0097813 A1 | 4/2009 | Hill |
| 2009/0110347 A1 | 4/2009 | Jacobsson |
| 2009/0121092 A1 | 5/2009 | Keith |
| 2009/0136194 A1 | 5/2009 | Barnes |
| 2009/0136195 A1 | 5/2009 | Smrha et al. |
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0166404 A1 | 7/2009 | German et al. |
| 2009/0169163 A1 | 7/2009 | Abbott, III et al. |
| 2009/0175588 A1 | 7/2009 | Brandt et al. |
| 2009/0180749 A1 | 7/2009 | Douglas et al. |
| 2009/0184221 A1 | 7/2009 | Sculler |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1 | 8/2009 | Holmberg et al. |
| 2009/0207577 A1 | 8/2009 | Fransen et al. |
| 2009/0208178 A1 | 8/2009 | Kowalczyk et al. |
| 2009/0208210 A1 | 8/2009 | Trojer et al. |
| 2009/0212679 A1 | 8/2009 | Frousiakis et al. |
| 2009/0214171 A1 | 8/2009 | Coburn et al. |
| 2009/0220200 A1 | 9/2009 | Sheau Tung Wong et al. |
| 2009/0220204 A1 | 9/2009 | Ruiz |
| 2009/0226142 A1 | 9/2009 | Barnes et al. |
| 2009/0238531 A1 | 9/2009 | Holmberg et al. |
| 2009/0245743 A1 | 10/2009 | Cote et al. |
| 2009/0245744 A1 | 10/2009 | Smith et al. |
| 2009/0252472 A1* | 10/2009 | Solheid et al. ............ 385/135 |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269016 A1 | 10/2009 | Korampally et al. |
| 2009/0269018 A1 | 10/2009 | Frohlich et al. |
| 2009/0269019 A1 | 10/2009 | Andrus et al. |
| 2009/0274429 A1 | 11/2009 | Krampotich et al. |
| 2009/0274430 A1 | 11/2009 | Krampotich et al. |
| 2009/0274432 A1 | 11/2009 | Iwaya |
| 2009/0290842 A1 | 11/2009 | Bran de Leon et al. |
| 2009/0297111 A1 | 12/2009 | Reagan et al. |
| 2009/0297112 A1 | 12/2009 | Mertesdorf et al. |
| 2009/0304342 A1 | 12/2009 | Adomeit et al. |
| 2009/0324189 A1 | 12/2009 | Hill et al. |
| 2010/0003000 A1 | 1/2010 | Rapp et al. |
| 2010/0012671 A1 | 1/2010 | Vrondran et al. |
| 2010/0027953 A1 | 2/2010 | Russell |
| 2010/0054669 A1 | 3/2010 | DiMarco |
| 2010/0054681 A1 | 3/2010 | Biribuze et al. |
| 2010/0054682 A1 | 3/2010 | Cooke et al. |
| 2010/0054683 A1 | 3/2010 | Cooke et al. |
| 2010/0054684 A1 | 3/2010 | Cooke et al. |
| 2010/0054685 A1 | 3/2010 | Cooke et al. |
| 2010/0054686 A1 | 3/2010 | Cooke et al. |
| 2010/0054687 A1 | 3/2010 | Ye et al. |
| 2010/0061693 A1 | 3/2010 | Bran de Leon et al. |
| 2010/0074587 A1 | 3/2010 | Loeffelholz et al. |
| 2010/0080517 A1 | 4/2010 | Cline et al. |
| 2010/0086267 A1 | 4/2010 | Cooke et al. |
| 2010/0086274 A1 | 4/2010 | Keith |
| 2010/0111483 A1 | 5/2010 | Reinhardt et al. |
| 2010/0119201 A1 | 5/2010 | Smrha et al. |
| 2010/0129035 A1 | 5/2010 | Teo |
| 2010/0142544 A1 | 6/2010 | Chapel et al. |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0171350 A1* | 7/2010 | Large et al. ............ 297/217.3 |
| 2010/0178022 A1 | 7/2010 | Schroeder et al. |
| 2010/0195970 A1 | 8/2010 | Mudd et al. |
| 2010/0202740 A1 | 8/2010 | Barlowe et al. |
| 2010/0202745 A1 | 8/2010 | Sokolowski et al. |
| 2010/0202748 A1 | 8/2010 | Pierce et al. |
| 2010/0220967 A1 | 9/2010 | Cooke et al. |
| 2010/0220968 A1 | 9/2010 | Dagley et al. |
| 2010/0247051 A1 | 9/2010 | Kowalczyk et al. |
| 2010/0266245 A1 | 10/2010 | Sabo |
| 2010/0278499 A1 | 11/2010 | Mures et al. |
| 2010/0296790 A1 | 11/2010 | Cooke et al. |
| 2010/0296791 A1 | 11/2010 | Makrides-Saravanos et al. |
| 2010/0310225 A1 | 12/2010 | Anderson et al. |
| 2010/0310226 A1 | 12/2010 | Wakileh et al. |
| 2010/0314341 A1* | 12/2010 | Bailey ............ 211/43 |
| 2010/0316334 A1 | 12/2010 | Kewitsch |
| 2010/0322554 A1 | 12/2010 | Barnes et al. |
| 2010/0322579 A1 | 12/2010 | Cooke et al. |
| 2010/0322580 A1 | 12/2010 | Beamon et al. |
| 2010/0322581 A1 | 12/2010 | Cooke et al. |
| 2010/0322582 A1 | 12/2010 | Cooke et al. |
| 2010/0322583 A1 | 12/2010 | Cooke et al. |
| 2010/0329624 A1 | 12/2010 | Zhou et al. |
| 2011/0008004 A1 | 1/2011 | Liao et al. |
| 2011/0038592 A1 | 2/2011 | Mudd |
| 2011/0069931 A1 | 3/2011 | Cote et al. |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |
| 2011/0097977 A1 | 4/2011 | Bubnick et al. |
| 2011/0129185 A1 | 6/2011 | Lewallen et al. |
| 2011/0129186 A1 | 6/2011 | Lewallen et al. |
| 2011/0186532 A1 | 8/2011 | Wu |
| 2011/0192631 A1 | 8/2011 | Burek et al. |
| 2011/0211799 A1 | 9/2011 | Conner et al. |
| 2011/0217014 A1 | 9/2011 | Dominique |
| 2011/0217016 A1 | 9/2011 | Mullsteff |
| 2011/0222821 A1 | 9/2011 | Pitwon et al. |
| 2011/0235979 A1 | 9/2011 | Anderson et al. |
| 2011/0249950 A1 | 10/2011 | Chapa Ramirez et al. |
| 2011/0268404 A1 | 11/2011 | Cote et al. |
| 2011/0268405 A1 | 11/2011 | Cote et al. |
| 2011/0268407 A1 | 11/2011 | Cowen et al. |
| 2011/0268408 A1 | 11/2011 | Giraud et al. |
| 2011/0268413 A1 | 11/2011 | Cote et al. |
| 2011/0268414 A1 | 11/2011 | Giraud et al. |
| 2011/0280537 A1 | 11/2011 | Cowen et al. |
| 2011/0299823 A1* | 12/2011 | Bran De Leon et al. ...... 385/135 |
| 2012/0025683 A1 | 2/2012 | Mattlin et al. |

(56) References Cited

U.S. PATENT DOCUMENTS

| | | |
|---|---|---|
| 2012/0051707 A1 | 3/2012 | Barnes et al. |
| 2012/0057838 A1 | 3/2012 | Hill et al. |
| 2012/0106899 A1 | 5/2012 | Choi |
| 2012/0183263 A1 | 7/2012 | Wu |
| 2012/0183289 A1 | 7/2012 | Lou et al. |
| 2012/0219263 A1 | 8/2012 | Beamon et al. |
| 2012/0288244 A1 | 11/2012 | Wu et al. |
| 2012/0288248 A1 | 11/2012 | Chapa Ramirez et al. |
| 2012/0301083 A1 | 11/2012 | Carter et al. |
| 2013/0004136 A1 | 1/2013 | Brower et al. |
| 2013/0058616 A1 | 3/2013 | Cote et al. |
| 2013/0077927 A1 | 3/2013 | O'Connor |
| 2013/0209049 A1* | 8/2013 | Kowalczyk et al. .......... 385/135 |
| 2013/0214108 A1 | 8/2013 | Irudayaraj et al. |
| 2013/0266282 A1 | 10/2013 | Cote et al. |
| 2013/0308916 A1 | 11/2013 | Buff et al. |
| 2013/0322839 A1* | 12/2013 | Claessens et al. .......... 385/135 |
| 2014/0003782 A1 | 1/2014 | Blackwell, Jr. et al. |
| 2014/0010510 A1 | 1/2014 | Blackard |
| 2014/0112628 A1 | 4/2014 | Keenum et al. |

FOREIGN PATENT DOCUMENTS

| | | | |
|---|---|---|---|
| CA | 2186314 A1 | 4/1997 | |
| CA | 2765835 A1 | 1/2011 | |
| CH | 688705 A5 | 1/1998 | |
| CN | 102460258 A | 5/2012 | |
| DE | 8711970 U1 | 10/1987 | |
| DE | 3726718 A1 | 2/1989 | |
| DE | 3726719 A1 | 2/1989 | |
| DE | 4030301 A1 | 3/1992 | |
| DE | 4231181 C1 | 8/1993 | |
| DE | 20115940 U1 | 1/2002 | |
| DE | 10338848 A1 | 3/2005 | |
| DE | 202005009932 U1 | 11/2005 | |
| DE | 202007000556 U1 | 10/2007 | |
| DE | 102007024476 A1 | 11/2008 | |
| DE | 202010009385 U1 | 9/2010 | |
| EP | 29512 A1 | 6/1981 | |
| EP | 0105597 A2 | 4/1984 | |
| EP | 0250900 A2 | 1/1988 | |
| EP | 0408266 A2 | 1/1991 | |
| EP | 0474091 A1 | 8/1991 | |
| EP | 0468671 A1 | 1/1992 | |
| EP | 0490698 A1 | 6/1992 | |
| EP | 0529830 A1 | 3/1993 | |
| EP | 0544004 A1 | 6/1993 | |
| EP | 0547778 A1 | 6/1993 | |
| EP | 0581527 A1 | 2/1994 | |
| EP | 0620462 A1 | 10/1994 | |
| EP | 0693699 A1 | 1/1996 | |
| EP | 0720322 A2 | 7/1996 | |
| EP | 0776557 B1 | 6/1997 | |
| EP | 0940700 A2 | 9/1999 | |
| EP | 0949522 A2 | 10/1999 | |
| EP | 1041417 A2 | 10/2000 | |
| EP | 1056177 A1 | 11/2000 | |
| EP | 1065542 A1 | 1/2001 | |
| EP | 1162485 A2 | 12/2001 | |
| EP | 1203974 A2 | 5/2002 | |
| EP | 1289319 A2 | 3/2003 | |
| EP | 1310816 A2 | 5/2003 | |
| EP | 1316829 A2 | 6/2003 | |
| EP | 1367308 A1 | 12/2003 | |
| EP | 1621907 A1 | 2/2006 | |
| EP | 1777563 A1 | 4/2007 | |
| EP | 2060942 A2 | 5/2009 | |
| EP | 1280363 B1 | 9/2009 | |
| EP | 2159613 A2 | 3/2010 | |
| EP | 2639613 A1 * | 9/2013 | .............. G02B 6/44 |
| FR | 1586331 A | 2/1970 | |
| FR | 2123728 A5 | 9/1972 | |
| FR | 2378378 A1 | 8/1978 | |
| GB | 2241591 A | 9/1991 | |
| GB | 2277812 A | 11/1994 | |
| GB | 2367378 A | 4/2002 | |
| GB | 2367379 A | 4/2002 | |
| GB | 2368136 A | 4/2002 | |
| GB | 2377839 A | 1/2003 | |
| JP | 3060994 A | 3/1991 | |
| JP | 3172806 A | 7/1991 | |
| JP | 3281378 A | 12/1991 | |
| JP | 5045541 A | 2/1993 | |
| JP | 06018749 A | 1/1994 | |
| JP | 7308011 A | 11/1995 | |
| JP | 7318761 A | 12/1995 | |
| JP | 8007308 A | 1/1996 | |
| JP | 8248235 A | 9/1996 | |
| JP | 8248237 A | 9/1996 | |
| JP | 3487946 A | 10/1996 | |
| JP | 8254620 A | 10/1996 | |
| JP | 3279474 A | 10/1997 | |
| JP | 9258033 A | 10/1997 | |
| JP | 9258055 A | 10/1997 | |
| JP | 2771870 B2 | 7/1998 | |
| JP | 3448448 A | 8/1998 | |
| JP | 10227919 A | 8/1998 | |
| JP | 3478944 A | 12/1998 | |
| JP | 10332945 A | 12/1998 | |
| JP | 10339817 A | 12/1998 | |
| JP | 11023858 A | 1/1999 | |
| JP | 2000098138 A | 4/2000 | |
| JP | 2000098139 A | 4/2000 | |
| JP | 2000241631 A | 9/2000 | |
| JP | 2001004849 A | 1/2001 | |
| JP | 3160322 B2 | 4/2001 | |
| JP | 2001133636 A | 5/2001 | |
| JP | 3173962 B2 | 6/2001 | |
| JP | 3176906 B2 | 6/2001 | |
| JP | 2001154030 A | 6/2001 | |
| JP | 2001159714 A | 6/2001 | |
| JP | 2002022974 A | 1/2002 | |
| JP | 2002077236 A | 3/2002 | |
| JP | 2002116337 A | 4/2002 | |
| JP | 2002169035 A | 6/2002 | |
| JP | 3312893 B2 | 8/2002 | |
| JP | 2002305389 A | 10/2002 | |
| JP | 3344701 B2 | 11/2002 | |
| JP | 2003029054 A | 1/2003 | |
| JP | 3403573 B2 | 5/2003 | |
| JP | 2003169026 A | 6/2003 | |
| JP | 2003215353 A | 7/2003 | |
| JP | 2003344701 A | 12/2003 | |
| JP | 3516765 B2 | 4/2004 | |
| JP | 2004144808 A | 5/2004 | |
| JP | 2004514931 A | 5/2004 | |
| JP | 3542939 B2 | 7/2004 | |
| JP | 2004246147 A | 9/2004 | |
| JP | 2004361652 A | 12/2004 | |
| JP | 2004361893 A | 12/2004 | |
| JP | 3107704 U | 2/2005 | |
| JP | 2005055748 A | 3/2005 | |
| JP | 2005062569 A | 3/2005 | |
| JP | 2005084241 A | 3/2005 | |
| JP | 2005148327 A | 6/2005 | |
| JP | 2005257937 A | 9/2005 | |
| JP | 3763645 B2 | 4/2006 | |
| JP | 3778021 B2 | 5/2006 | |
| JP | 2006126513 A | 5/2006 | |
| JP | 2006126516 A | 5/2006 | |
| JP | 3794540 B2 | 7/2006 | |
| JP | 2006227041 A1 | 8/2006 | |
| JP | 3833638 B2 | 10/2006 | |
| JP | 2006292924 A | 10/2006 | |
| JP | 3841344 B2 | 11/2006 | |
| JP | 3847533 B2 | 11/2006 | |
| JP | 200747336 A | 2/2007 | |
| JP | 3896035 B2 | 3/2007 | |
| JP | 2007067458 A1 | 3/2007 | |
| JP | 3934052 B2 | 6/2007 | |
| JP | 3964191 B2 | 8/2007 | |
| JP | 3989853 B2 | 10/2007 | |
| JP | 4026244 B2 | 12/2007 | |

(56) References Cited

FOREIGN PATENT DOCUMENTS

| | | |
|---|---|---|
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 4184329 B2 | 11/2008 |
| JP | 2008271017 A | 11/2008 |
| JP | 2008542822 T | 11/2008 |
| JP | 2009503582 T | 1/2009 |
| JP | 2009229506 A | 10/2009 |
| JP | 2012065019 A | 3/2012 |
| KR | 20110037404 A | 4/2011 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9638752 A1 | 12/1996 |
| WO | 9712268 A1 | 4/1997 |
| WO | 9722025 A1 | 6/1997 |
| WO | 9736197 A1 | 10/1997 |
| WO | 9744605 A1 | 11/1997 |
| WO | 9825416 A1 | 6/1998 |
| WO | 9927404 A1 | 6/1999 |
| WO | 0005611 A2 | 2/2000 |
| WO | 0127660 A2 | 4/2001 |
| WO | 0130007 A2 | 4/2001 |
| WO | 0180596 A1 | 10/2001 |
| WO | 0242818 A1 | 5/2002 |
| WO | 03009527 A2 | 1/2003 |
| WO | 03014943 A1 | 2/2003 |
| WO | 2004052066 A1 | 6/2004 |
| WO | 2005020400 A1 | 3/2005 |
| WO | 2006076062 A | 7/2006 |
| WO | 2006108024 A1 | 10/2006 |
| WO | 2007050515 A1 | 5/2007 |
| WO | 2007079074 A2 | 7/2007 |
| WO | 2007089682 A2 | 8/2007 |
| WO | 2007149215 A2 | 12/2007 |
| WO | 2008027201 A2 | 3/2008 |
| WO | 2008063054 A2 | 5/2008 |
| WO | 2008113054 A2 | 9/2008 |
| WO | 2008157248 A1 | 12/2008 |
| WO | 2009026688 A1 | 3/2009 |
| WO | 2009029485 A1 | 3/2009 |
| WO | 2009030360 A1 | 3/2009 |
| WO | 2009120280 A2 | 10/2009 |
| WO | 2010024847 A2 | 3/2010 |
| WO | 2010080745 A1 | 7/2010 |
| WO | 2011005461 A1 | 1/2011 |
| WO | 2011059955 A1 | 5/2011 |

OTHER PUBLICATIONS

Non-final Office Action for U.S. Appl. No. 13/795,888 mailed Aug. 1, 2014, 23 pages.
Non-final Office Action for U.S. Appl. No. 13/282,028 mailed Jul. 7, 2014, 17 pages.
Corning Cable Systems, "MTX Frames and Accessories," Feb. 2006, 4 pages.
Panduit, "Lock-in LC Duplex Clip," Accessed Mar. 22, 2012, 1 page.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
"MPO Fiber Optic Rack Panels now available from L-com Connectivity Products," article dated Jun. 4, 2007, 16 pages, http://www.l-com.com/content/Article.aspx?Type=P&ID=438.
"19" Rack Panel with 16 MPO Fiber Optic Couplers—1U high, product page, accessed Oct. 23, 2012, 2 pages, http://www.l-com.com/item.aspx?id=9767#.UlbgG8XXay5.
"Drawing for L-com 1U Panel with 16 MTP couplers," May 15, 2007, 1 page, http://www.l-com.com/multimedia/eng_drawings/PR17516MTP.pdf.
"RapidNet Fibre MTP VHD Cassette," Brochure, Date Unknown, 1 page, http://www.hellermanntyton.se/documents/5000/576_fiber_1U.pdf.
"MPO for Gigabit Ethernet/FAS-NET MTP Solution," Brochure, Date Unknown, 11 pages, http://www.infinique.com/upload/13182286190.pdf.
"Hubbell OptiChannel High Density 144 Port 1U Fiber Enclosure," Brochure, Date Unknown, 2 pages, http://www.hubbell-premise.com/literature/PLDF010.pdf.
Unknown, Author, "QuickNet SFQ Series MTP Fiber Optic Cassettes," Panduit Specification Sheet, Jan. 2009, 2 pages.
Unknown Author, "Cellular Specialties introduces the first simulated in-building location-based tracking solution," smart-grid.tmenet.com/news, Sep. 14, 2009, 2 pages.
Unknown Author, "CDMA Co-Pilot Transmitter," Cellular Specialties, Inc., Aug. 2009, 2 pages.
Ramdas, "Modem File Systems and Storage," Proceedings of the 2nd International SANE Conference, May 22-25, 2000, MECC, Maastricht, The Netherlands, Copyright Rodney R. Ramdas, 10 pages.
Author Unknown, "144 Fiber Patch Panel 1U," Technical Data, ADTEK Group Limited, 2009, 2 pages.
Author Unknown, "FiberManager Frame Cross-connect Configuration Fiber Tracing Option: Installation and Maintenance," Siecor Corporation, A0402884, Release 04.00, Jul. 1995, 80 pages.
Author Unknown, "FOS-FDF", Corning Cable Systems, SRP-003-305, Issue 4, Mar. 2001, 17 pages.
Author Unknown, "Optical Management Shelf (OMS)," Corning Cable Systems, Standard Recommended Procedure (SRP) 003-600, Issue 3, Apr. 2004, 9 pages.
Author Unknown, "Single Shelf HDF Installation," Standard Recommended Procedure (SRP) 003-377, Corning Cable Systems, Issue 5, Aug. 2001, pp. 1-12.
Final Office Action for U.S. Appl. No. 13/539,683 mailed Nov. 13, 2014, 9 pages.

* cited by examiner

FIBER OPTIC MANAGEMENT UNIT AND FIBER OPTIC DISTRIBUTION DEVICE

PRIORITY CLAIM

This application claim the benefit of priority under 35 U.S.C. §119 of European Patent Application Serial No. 12190123.5 filed on Oct. 26, 2012, the content of which is relied upon and incorporated herein by reference in its entirety.

BACKGROUND

1. Field

The present patent application relates to a fiber optic management unit. Further on, the present patent application relates to a fiber optic distribution device comprising at least two fiber optic management units.

2. Technical Background

When designing data transmission networks comprising optical fibers, it is necessary to handle optical fibers, especially to connect optical fibers to one another. Junctions between optical fibers can be provided by patch connections and splice connections. Such junctions need to be handled both outside buildings and inside buildings. Outside buildings, junctions between optical fibers are accommodated in so called cable sleeves or street cabinets. Inside buildings, junctions between optical fiber are handled in so called distribution cabinets or distribution frames. So called wall boxes are used for the handling of junctions between optical fibers both outside buildings and inside buildings.

U.S. Pat. No. 5,689,606 shows a fiber optic management unit for handling optical fibers. The fiber optic management unit known from U.S. Pat. No. 5,689,606 comprises a base having two segments running perpendicular to each other, wherein the fiber optic management unit is mountable to a support structure through a first segment of the base, and wherein the two segments of the base provide a fiber routing track for optical fibers. The fiber optic management unit known from U.S. Pat. No. 5,689,606 further comprises a tray, wherein the tray is pivotably attached to a free end of a second segment of the base in such a way that the tray is transferable between a first position in which the fiber routing track of the first segment is closed and a second position in which the fiber routing track of the first segment is opened by pivoting the tray around a first axis.

SUMMARY

The present application is based on providing a novel fiber optic management unit and a novel fiber optic distribution device suitable for handling optical fibers both outside buildings and inside buildings, the fiber optic management unit being modular and scalable on demand.

The tray of the fiber optic management unit according to the present patent application is in addition transferable between the second position in which the fiber routing track of the first segment is opened and a third position in which the fiber routing track of the first segment is also opened by pivoting the tray around a second axis running perpendicular to the first axis.

The fiber optic management unit according to the present patent application is a modular, scalable fiber optic management unit for fiber optic distribution devices. The fiber optic management unit according to the present patent application enables capacity-growth and provides a high density solution. The fiber optic management unit according to the present patent application provides a common installation method that does not depend on the number of optical fibers to be handled.

Preferably, the tray is transferable between the first position and the second position by pivoting the same around the first axis by approximately 90° and between the second position and the third position by pivoting the same around the second axis by approximately 90°, wherein the first pivoting axis runs perpendicular to the routing direction of optical fibers through the second segment of the base, and wherein the second pivoting axis runs parallel to the routing direction of optical fibers through the second segment of the base. The fiber optic management enables capacity-growth on demand and provides a high density solution.

According to a preferred further development, the first axis and the second axis are both provided by a common hinge. Preferably, the hinge comprises a U-shaped first section with protrusions extending from opposite lateral walls of the first section providing the first axis, and further a cylinder-like second section extending from a middle wall of the first section providing the second axis, wherein the second section extends in an opposite direction from the middle wall of the first section than the opposite lateral walls of the same. Such a hinge is easy to manufacture and provides a reliable pivoting of the tray between the first position and the second position and between the second position and the third position.

Preferably, the U-shaped first section and the cylinder-like second section of the hinge comprise both a central feed-through channel for optical fibers guiding the optical fibers along the second axis. This allows a safe handling of the fibers with a minimal bending of the same when pivoting the tray around the first axis and around the second axis.

BRIEF DESCRIPTION OF THE DRAWINGS

Preferred embodiments of the fiber optic distribution device and fiber optic management unit are given in the dependent claims and the description below. Exemplary embodiments will be explained in more detail with reference to the drawing, in which:

DETAILED DESCRIPTION

Figure 1:
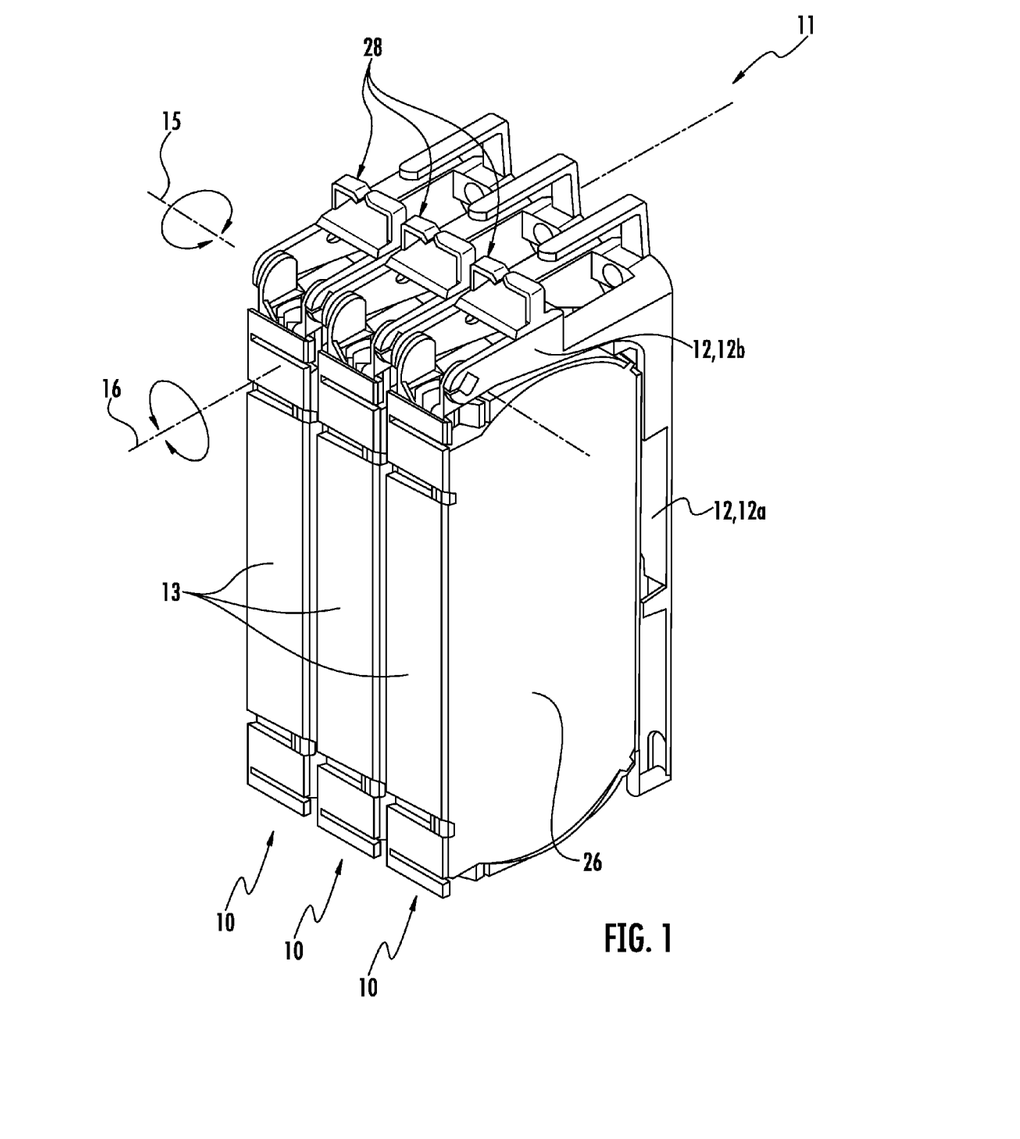
FIG. 1 shows an array of three fiber optic management units in a first status of the same.
Figure 2:
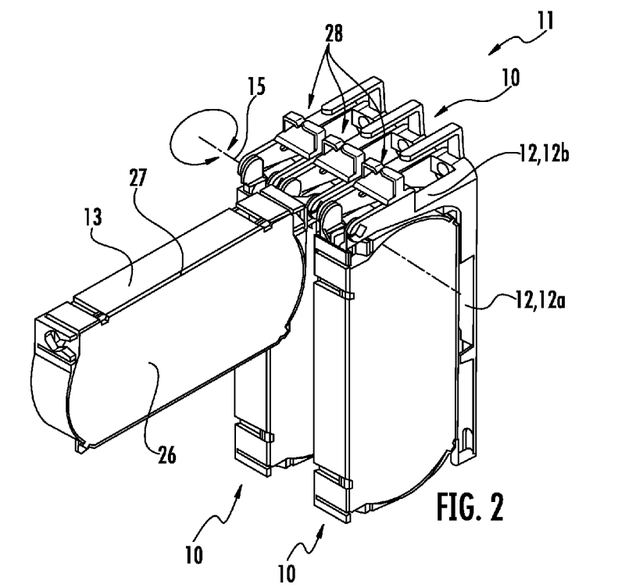
FIG. 2 shows the array of FIG. 1 with one fiber optic management unit being pivoted in a second status of the same.
Figure 3:
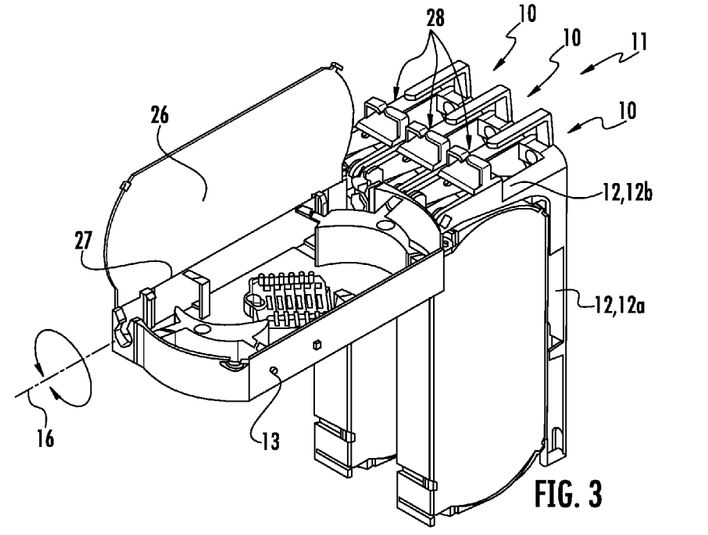
FIG. 3 shows the array of FIG. 1 with one fiber optic management unit being pivoted in a third status of the same.
Figure 4:
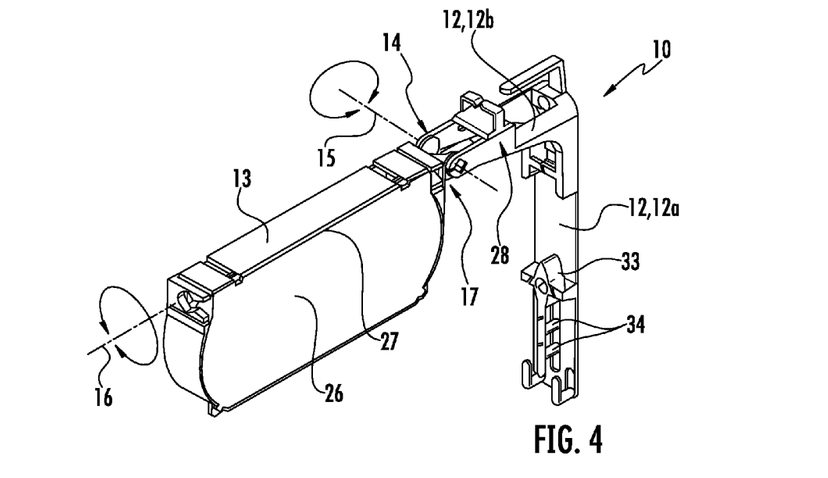
FIG. 4 shows one fiber optic management unit in the second status of the same.
Figure 5:
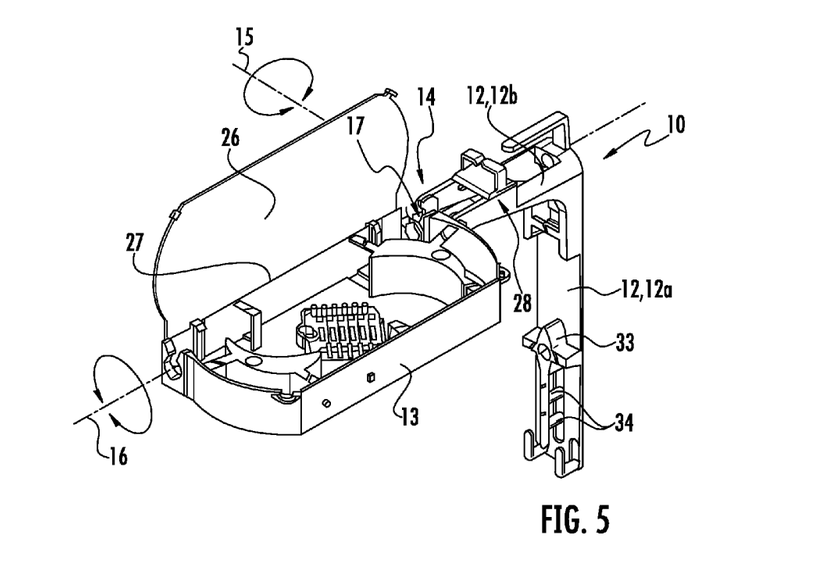
FIG. 5 shows one fiber optic management unit in the third status of the same.

The present patent application relates to a fiber optic management unit 10. Further on, the present patent application relates to a fiber optic distribution device comprising at least two fiber optic management units 10 positioned side by side providing an array of fiber optic management units 10. FIGS. 1 to 3 each show an array 11 of three fiber optic management units 10. FIGS. 4 and 5 each show one fiber optic management unit 10.

The fiber optic management unit 10 comprises a base 12 being L-shaped having two segments 12a, 12b running perpendicular to each other. The fiber optic management unit 10 is mountable to a support structure through a first segment 12a of the base 12. The two segments 12a, 12b of the base 12 provide a fiber routing track for optical fibers.

The fiber optic management unit 10 further comprises a tray 13. The tray 13 is pivotably attached to a free end 14 of a second segment 12b of the base 12 in such a way that tray 13 is transferable between a first position (see middle tray 13 in FIG. 1) in which the fiber routing track of the first segment 12a is closed and a second position (see FIG. 4 and middle tray 13 in FIG. 2) in which the fiber routing track of the first segment 12a is opened by pivoting the tray 12 around a first axis 15.

The tray 13 is in addition transferable between the second position (see FIG. 4 and middle tray 13 in FIG. 2) in which the fiber routing track of the first segment 12a is opened and a third position (see FIG. 5 and middle tray 13 in FIG. 3) in which the fiber routing track of the first segment 12a is also opened by pivoting the tray 13 around a second axis 16 running perpendicular to the first axis 15.

The tray 13 is transferable between the first position and the second position by pivoting the same around the first axis 15 by approximately 90°, wherein the first pivoting axis 15 runs perpendicular to the routing direction of optical fibers through the second segment 12b of the base 12. The tray 13 is transferable between the second position and the third position by pivoting the same around the second axis 16 by approximately 90°, wherein the second pivoting axis 16 runs parallel to the routing direction of optical fibers through the second segment 12b of the base 12.

All three positions of the tray 13 are stable. The first position (see middle tray 13 in FIG. 1) is typical when the fiber optic management unit 10 is not subjected to any work being done on it by installers. In this first position the tray 13 is well protected and access to the interior of the tray 13 is restricted. In addition, in this first position the fiber routing track in the base 12 is also protected and cannot be accessed. The second position (see middle tray 13 in FIG. 2) is a transition position where the fiber routing track in the base 12 can be accessed. However it's not a position where tray 13 is subjected to work being done on it. Compared to the first position, the tray 13 is in the second position rotated by 90° with respect to the base 12 around the first axis 15. The third position (see middle tray 13 in FIG. 3) is a position where the tray 13 is accessible. This is the position dedicated to splicing or managing of fibers within the tray 13. Compared to the second position, the tray 13 is in the third position rotated by 90° with respect to the base 12 around the second axis 16.

In each of the above mentioned positions the tray 13 is releasably locked and transition from one position to another requires a certain amount of a force applied to the tray 13 in the pivoting direction.

Figure 6:
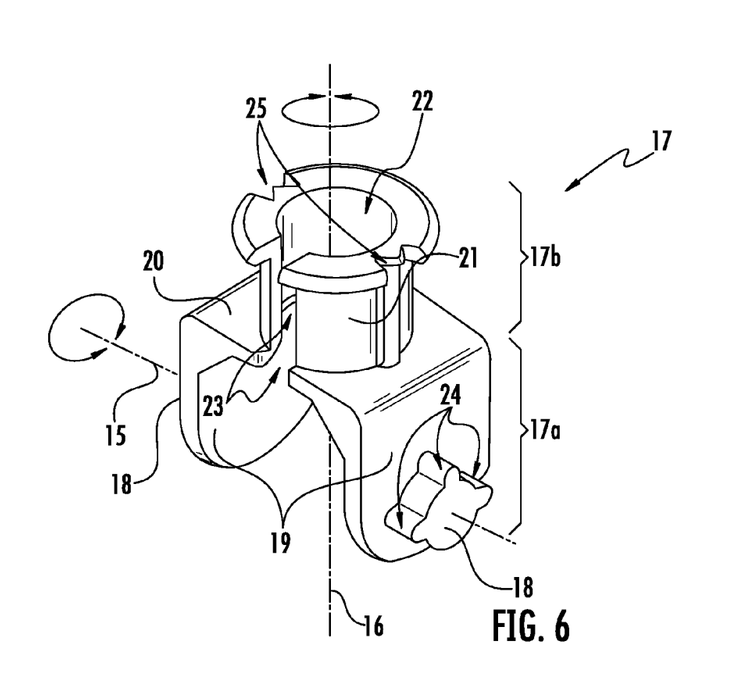
FIG. 6 shows a hinge of one fiber optic management unit.

The first pivoting axis 15 of the tray 13 and the second pivoting axis 16 of the tray 13 are both provided by a common hinge 17 (see FIG. 6). The hinge 17 attaches the tray 13 to the free end 14 of the second segment 12b of the base 12. The hinge 17 comprises a U-shaped first section 17a with preferably protrusions 18 extending from opposite lateral walls 19 of the first U section 17a providing the first pivoting axis 15. The hinge 17 further comprises a second section 17b with a cylinder-like wall 21 extending from a middle wall 20 of the first section 17a providing the second pivoting axis 16, wherein the second section 17b extends in an opposite direction from the middle wall 20 of the first section 17a than the opposite lateral walls 19 of the same.

The above described three positions of the tray 13 are technically feasible due to the design of the hinge 17. The hinge 17 provides the above described two independent axes 15 and 16 of revolution. The first axis 15 is based on the protrusions 18 of the first segment 17a of the hinge 17, whereby this first axis 15 is used to pivot the tray 13 with respect to the base 12 from the first position into the second position or vice versa from the second position into the first position. The second axis 16 is based on the cylinder-like wall 21 of second section 17b, whereby this second axis 16 is used to pivot the tray 13 with respect to the base 12 from the second position into the third position or vice versa from the third position into the second position.

The U-shaped first section 17a of the hinge 17 and the cylinder-like second section 17b of the hinge 17 comprise both a central feed-through channel 22 for optical fibers guiding the optical fibers along the second axis 16. The feed-through channel 22 is used to guide optical fibers from the base 12 to the tray 13, namely from the fiber routing track of the base 12 into the interior of the tray 13.

Due to the fact that the optical fibers run along the second pivoting axis 16 though the hinge 17, the optical fibers are subject only to a minimal bending while pivoting the tray 13 with respect to the base 12 from the second position into the third position or vice versa from the third position into the second position.

For better handling of the optical fibers, the hinge 17 has a lateral opening 23 which is used for inserting optical fibers into or removing optical fibers out of the feedthrough channel 22.

As described above, in each of the above positions of the tray 13 the same is releasably locked. The transition of the tray 13 from one position to another requires a certain value of a force applied to the tray 13 in the desired pivoting direction. This is provided by locking elements 24 and 25 being integral with the pin-like protrusions 18 of the first section 17a and the cylinder-like wall 21 of the second section 17b of the hinge 17. The locking elements 24 being integral with the protrusions 18 releasably lock the tray 13 with respect to the first pivoting axis 15. The locking elements 25 being integral with cylinder-like wall 21 releasably lock the tray 13 with respect to the second pivoting axis 16.

The tray 13 of the fiber optic management unit 10 comprises a cover 26. The cover 26 is closed in the first position of the tray 13 and in the second position of the tray 13, wherein the cover 26 can be opened in the third position of the tray 13 by pivoting the cover around a pivoting axis 27 running in parallel to the second axis 16 to provide access to the interior of the tray 13. When the cover 26 is closed access is not provided to the interior of the tray 13 and the cover 26 protects fiber optic equipment like splitters or WDM filters and/or the same protects junctions between optical fibers like patch connections or splice connections accommodated in the tray 13.

An entry guide 28 (see FIG. 7) for optical fibers is attached to the second segment 12b of the base 12. The fiber entry guide 28 is attached to the second segment 12b of the base 12 to provide bending radius control in the entry area of the tray 13. Additionally, the fiber entry guide 28 groups fibers into a single bunch.

Figure 7:
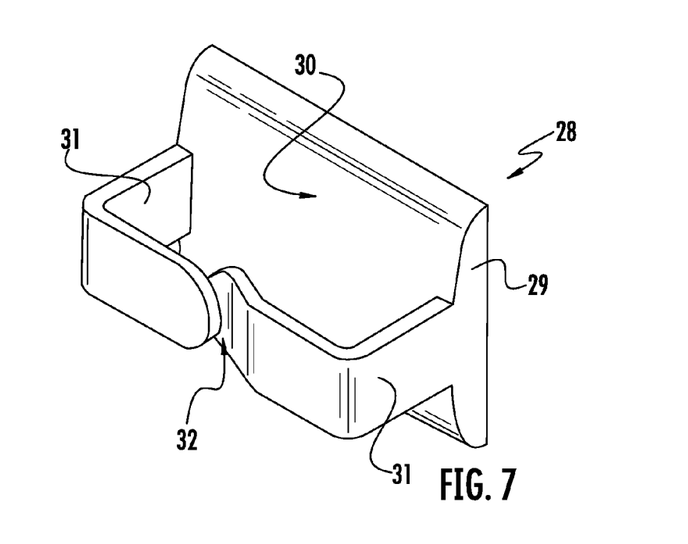
FIG. 7 shows an entry guide of one fiber optic management unit.

The fiber entry guide 28 comprises a basic body 29 with a round surface 30 providing safety bending radius control for the optical fibers entering the tray 13 through the feed-through channel 22 of the hinge 17. Further on, the fiber entry guide 28 comprises grouping arms 31 extending from the basic body 29 to collect separate fibers into a single bunch before entering the tray 13 through the feed-through channel 22 of the hinge 17. The grouping arms 31 are both L-shaped and define a slot 32 for inserting optical fibers into or removing optical fibers out of the fiber entry guide 28.

The first segment 12a of the base 12 through which the fiber optic management unit 10 is mountable to a support structure comprises guide elements 33, 34 for optical fibers.

First guide elements 33 guide optical fibers when the same run along one first segment 12a of one base 12 of a respective fiber optic management unit 10. Second guide elements 34 guide optical fibers when the same run perpendicular to this direction across several first segments 12b of fiber optic management units 10 being positioned side by side. The guide elements 33, 34 provide safety bending radius control for the optical fibers.

The fiber optic management units 10 of the array 11 are positioned side by side such that all of the trays 13 are aligned when all of the trays 13 are in the first position or when all of the trays 13 are in the second position. It is not possible that all of the trays 13 are in the third position at the same time.

Individual access to the trays 13 is allowed by pivoting the respective tray 13 successively around the first axis 15 and then around the second axis 16 thereby pivoting the respective tray 13 successively from the first position into the second position and afterwards from the second position into the third position.

The number of arrayed fiber optic management units 10 depends on the required fiber count capacity. The number of fiber optic management units 10 in an array is only limited to the available space in a fiber optic distribution device to which the fiber optic management units 10 are installed.

What is claimed is:

1. A fiber optic management unit for handling optical fibers, the fiber optic management unit comprising:
   a base having first and second segments running perpendicular to each other, wherein the fiber optic management unit is mountable to a support structure through the first segment of the base, and wherein the first and second segments of the base provide a fiber routing track for optical fibers; and
   a tray pivotably attached to a free end of the second segment of the base such that the tray is transferable between a first position in which the fiber routing track of the first segment is closed and a second position in which the fiber routing track of the first segment is opened when the tray is pivoted around a first axis, and wherein the tray is transferable between the second position in which the fiber routing track of the first segment is opened and a third position in which the fiber routing track of the first segment is also opened when the tray is pivoted around a second axis running perpendicular to the first axis.

2. The fiber optic management unit of claim 1, wherein the tray is transferable between the first position and the second position when the tray is pivoted around the first axis by approximately 90°.

3. The fiber optic management unit of claim 1, wherein the first pivoting axis runs perpendicular to the routing direction of optical fibers through the second segment of the base.

4. The fiber optic management unit of claim 1, wherein the tray is transferable between the second position and the third position when the tray is pivoted around the second axis by approximately 90°.

5. The fiber optic management unit of claim 1, wherein the second pivoting axis runs parallel to the routing direction of optical fibers through the second segment of the base.

6. The fiber optic management unit of claim 1, further comprising a common hinge, wherein the first axis and the second axis are both provided by a common hinge.

7. The fiber optic management unit of claim 6, wherein the common hinge comprises,
   a U-shaped first section with protrusions extending from opposite lateral walls of the first section providing the first axis, and
   a cylinder-like second section extending from a middle wall of the first section providing the second axis, wherein the second section extends in an opposite direction from the middle wall of the first section than the opposite lateral walls of the first section.

8. The fiber optic management unit of claim 7, wherein the U-shaped first section and the cylinder-like second section comprise both a central feed-through channel for optical fibers guiding the optical fibers in the direction of the second axis.

9. The fiber optic management unit of claim 8, wherein the U-shaped first section and the cylinder-like second section comprise both a lateral opening for inserting optical fibers into or for removing optical fibers out of the feed-through channel.

10. The fiber optic management unit of claim 7, wherein the protrusions are pin-like.

11. The fiber optic management unit of claim 7, further comprising locking elements are integral with the protrusions of the first section of the hinge and the cylinder-like wall of the second section of the hinge.

12. The fiber optic management unit of claim 1, wherein the tray comprises a cover, and wherein the cover is closed in the first and second position of the tray, and wherein the cover can be opened in the third position of the tray.

13. The fiber optic management unit of claim 1, further comprising an entry guide for optical fibers attached to the second segment of the of the base.

14. A fiber optic distribution device, comprising:
   a plurality of fiber optic management units, wherein each of the plurality of fiber management units comprises,
      a base having first and second segments running perpendicular to each other, wherein the fiber optic management unit is mountable to a support structure through the first segment of the base, and wherein the first and second segments of the base provide a fiber routing track for optical fibers; and
      a tray pivotably attached to a free end of the second segment of the base such that the tray is transferable between a first position in which the fiber routing track of the first segment is closed and a second position in which the fiber routing track of the first segment is opened when the tray is pivoted around a first axis, and wherein the tray is transferable between the second position in which the fiber routing track of the first segment is opened and a third position in which the fiber routing track of the first segment is also opened when the tray is pivoted around a second axis running perpendicular to the first axis, and
   wherein the fiber optic management units are positioned side by side providing an array of trays when all trays are in the first position and allowing individual access to the trays by pivoting the same successively around the first axis and then around the second axis.

* * * * *